Jan. 30, 1945.  A. L. STONE ET AL  2,368,499
LATHE AND TURRET MILL
Filed Aug. 1, 1940   19 Sheets-Sheet 7

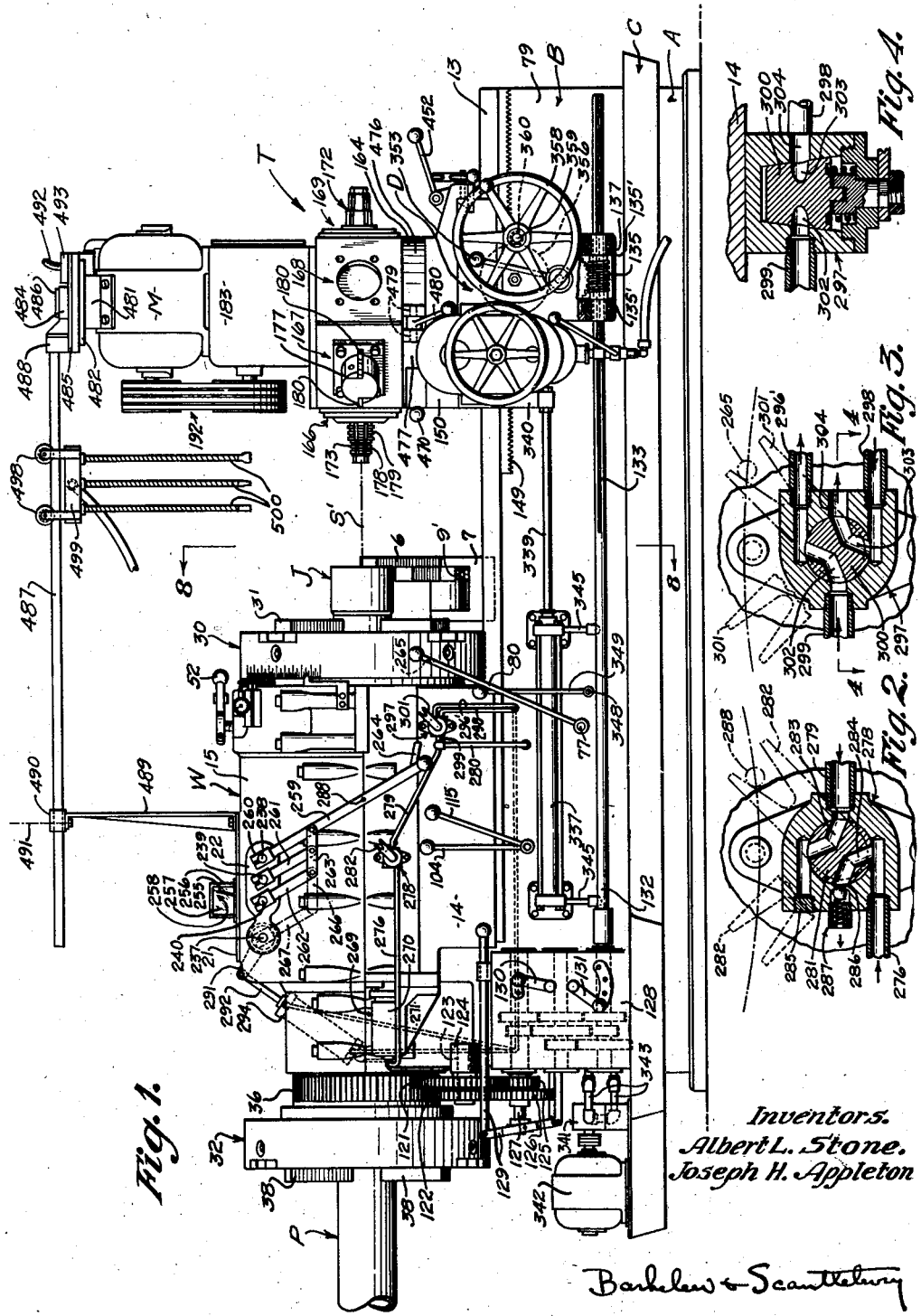

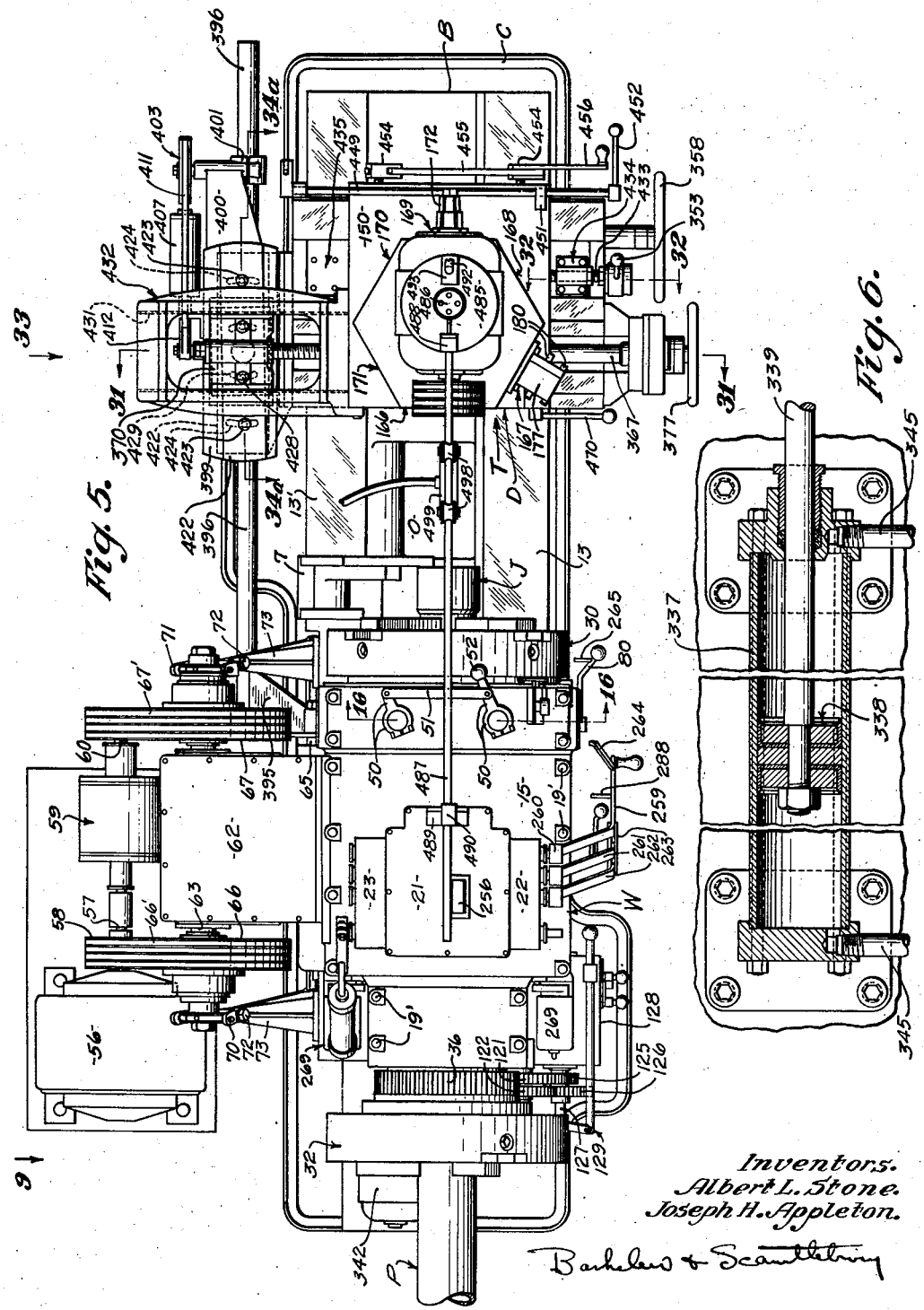

Inventors.
Albert L. Stone.
Joseph H. Appleton.

Attorneys.

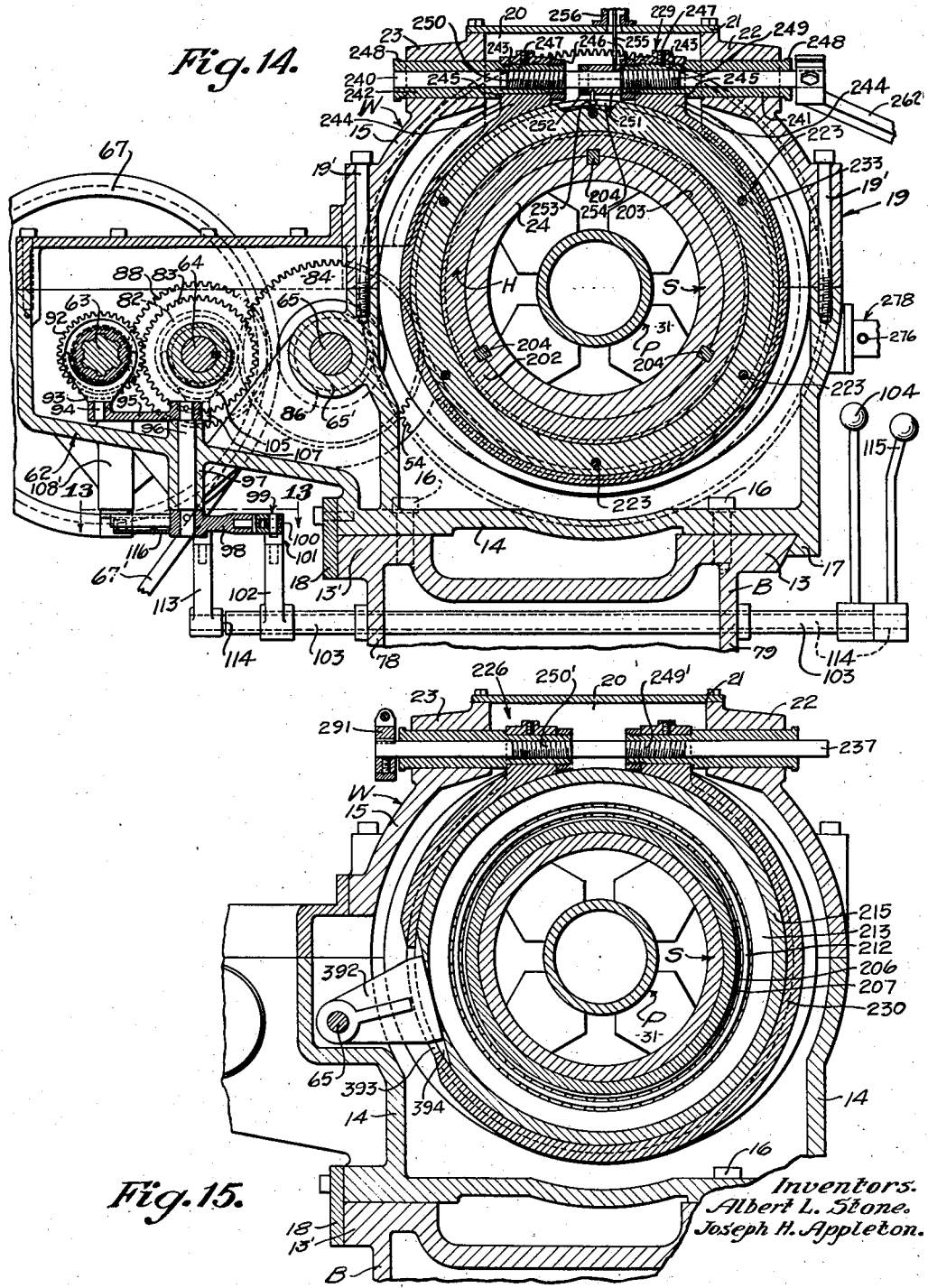

Jan. 30, 1945.  A. L. STONE ET AL  2,368,499
LATHE AND TURRET MILL
Filed Aug. 1, 1940  19 Sheets-Sheet 11

Inventors.
Albert L. Stone.
Joseph H. Appleton.

Attorneys.

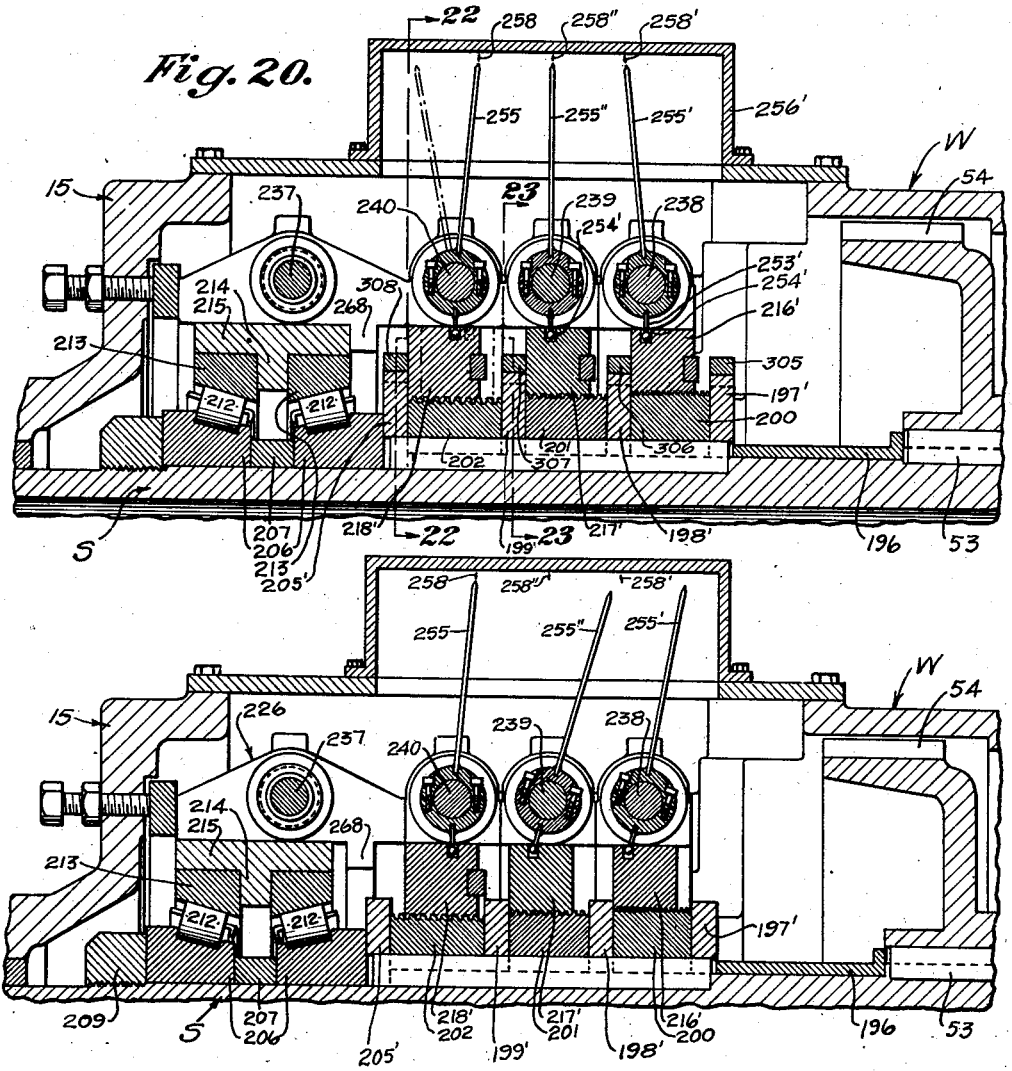

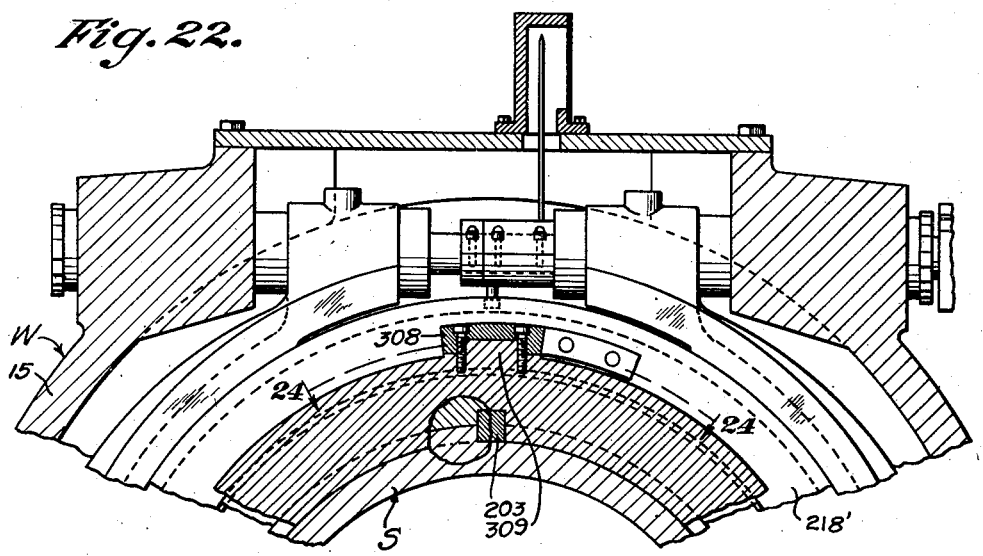

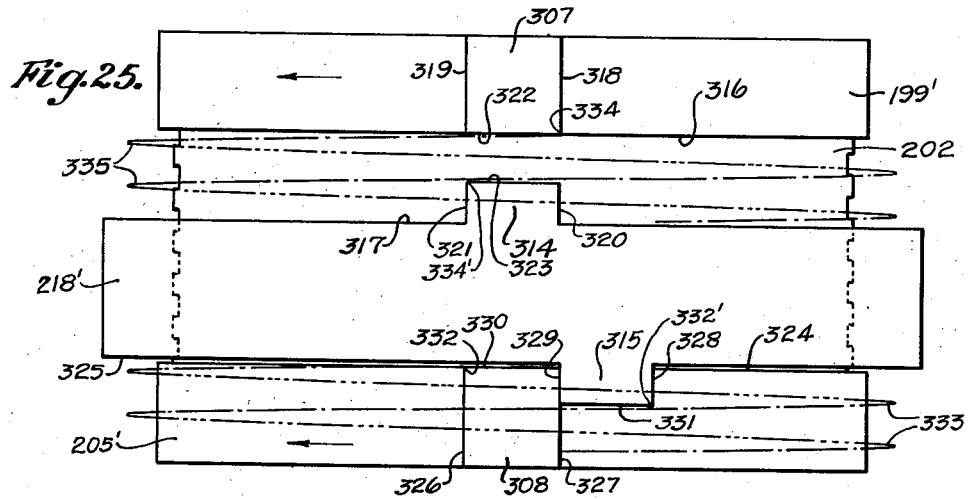
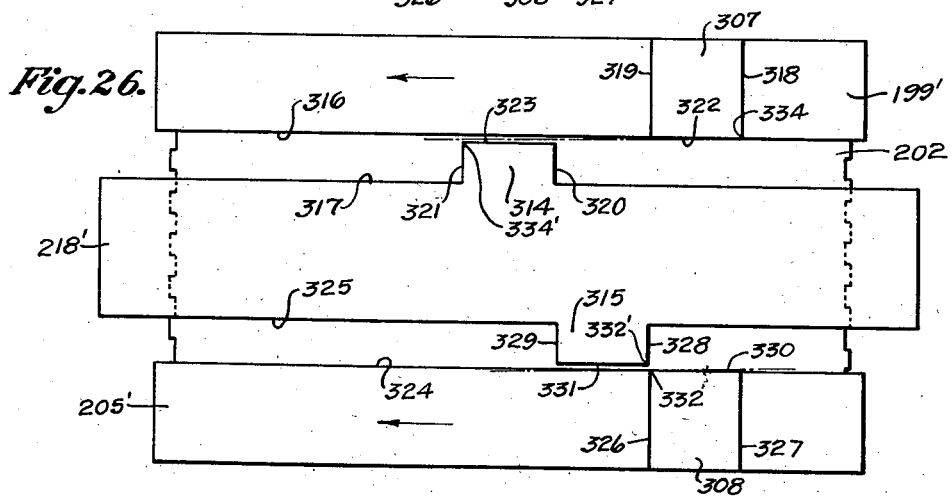
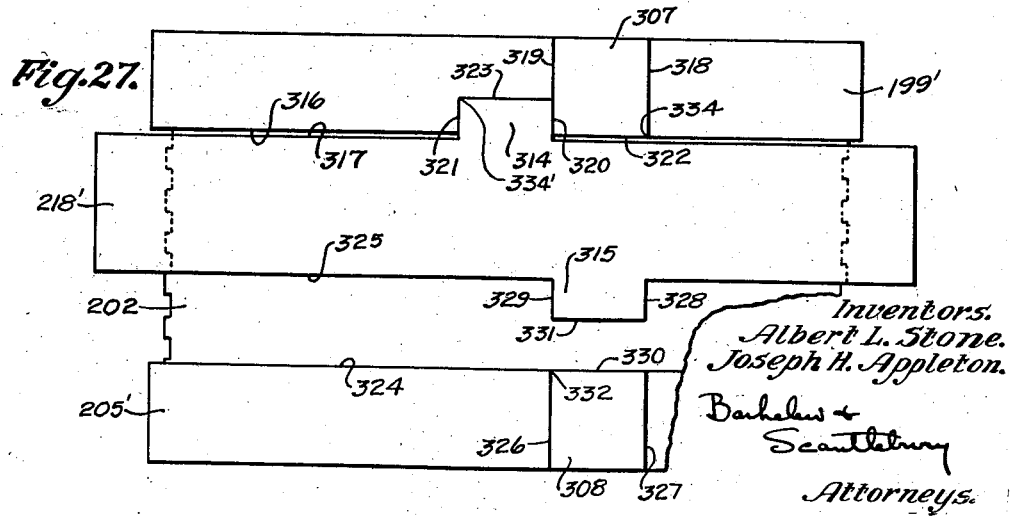

Jan. 30, 1945.  A. L. STONE ET AL  2,368,499
LATHE AND TURRET MILL
Filed Aug. 1, 1940  19 Sheets—Sheet 15

Inventors:
Albert L. Stone.
Joseph H. Appleton.

Attorneys.

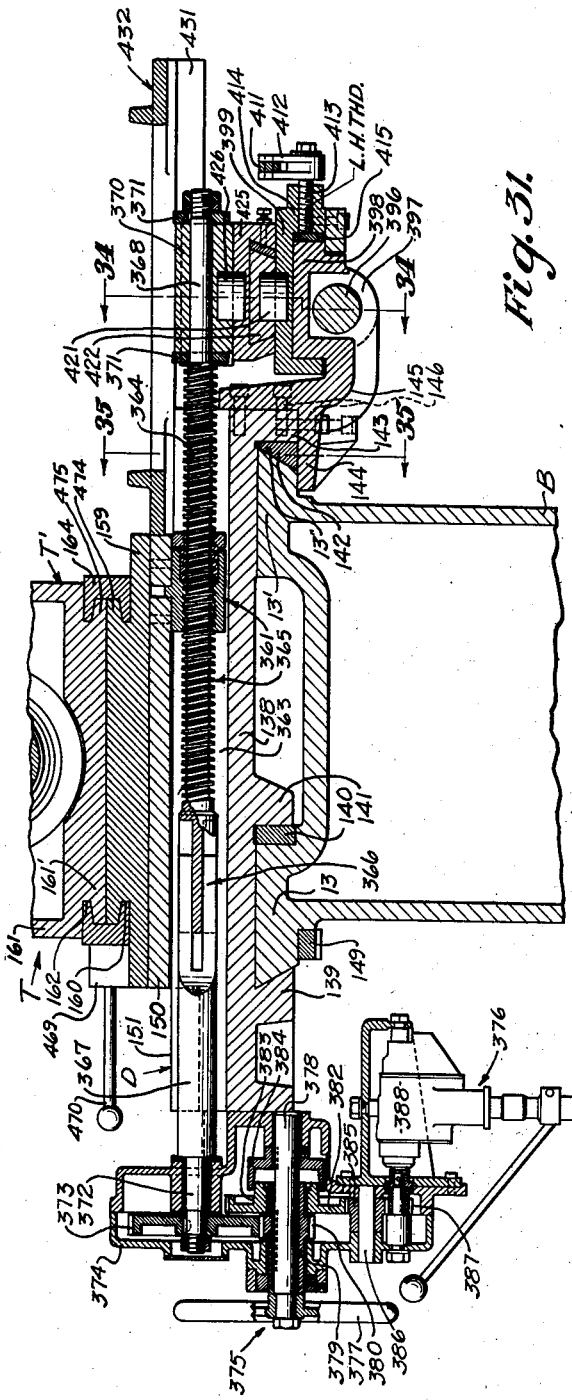

Jan. 30, 1945. A. L. STONE ET AL 2,368,499
LATHE AND TURRET MILL
Filed Aug. 1, 1940 19 Sheets-Sheet 17

Inventors.
Albert L. Stone.
Joseph H. Appleton.
Batchelor + Scantlebury
Attorneys.

Jan. 30, 1945.  A. L. STONE ET AL  2,368,499
LATHE AND TURRET MILL
Filed Aug. 1, 1940   19 Sheets-Sheet 18
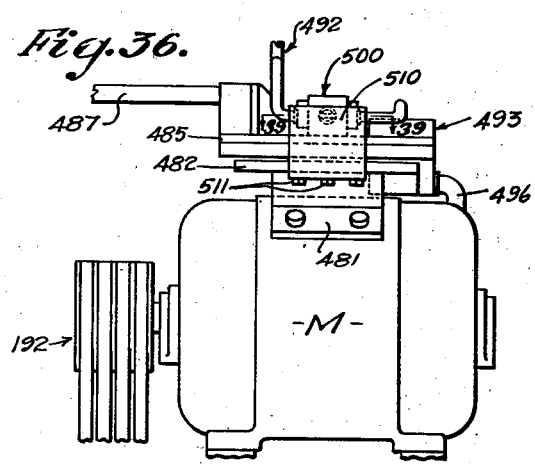
Fig. 36.
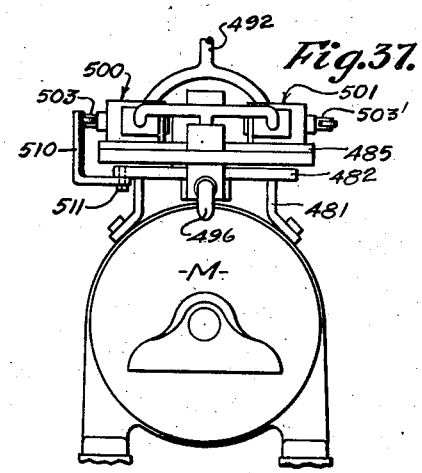
Fig. 37.
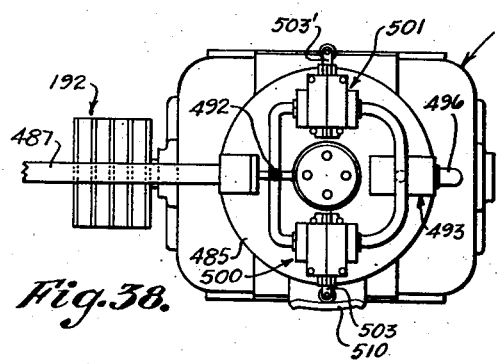
Fig. 38.
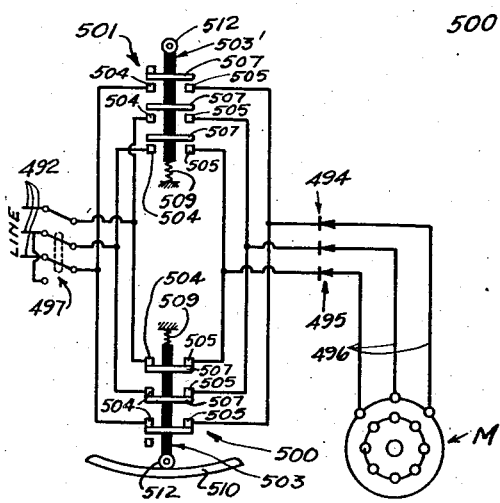
Fig. 40.
Fig. 39.
Inventors.
Albert L. Stone.
Joseph H. Appleton.
Attorneys.

Jan. 30, 1945.  A. L. STONE ET AL  2,368,499
LATHE AND TURRET MILL
Filed Aug. 1, 1940  19 Sheets-Sheet 19
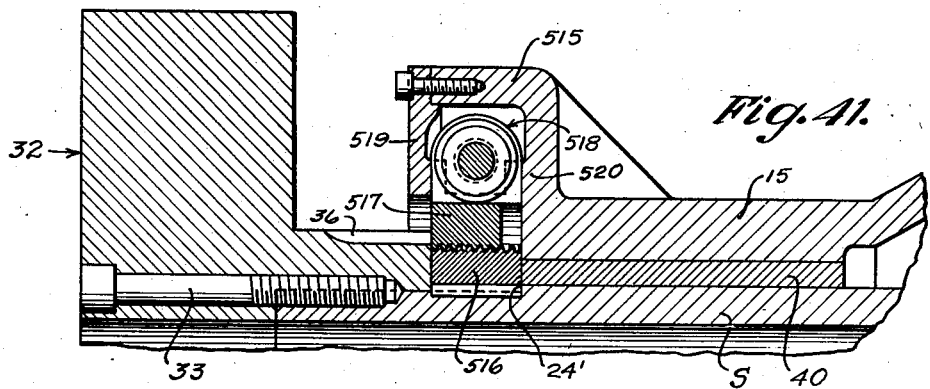
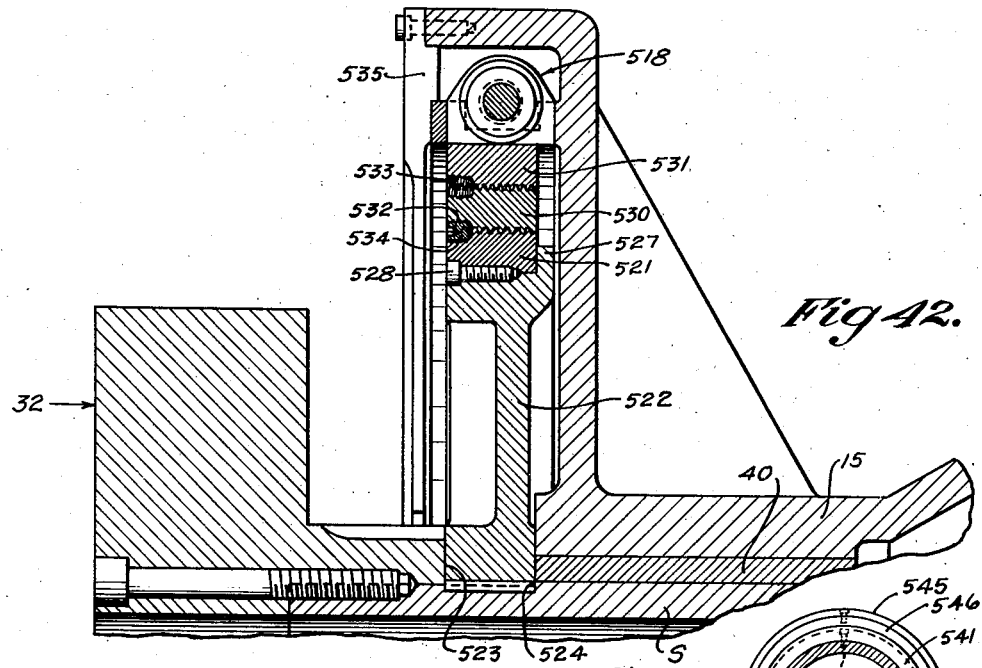
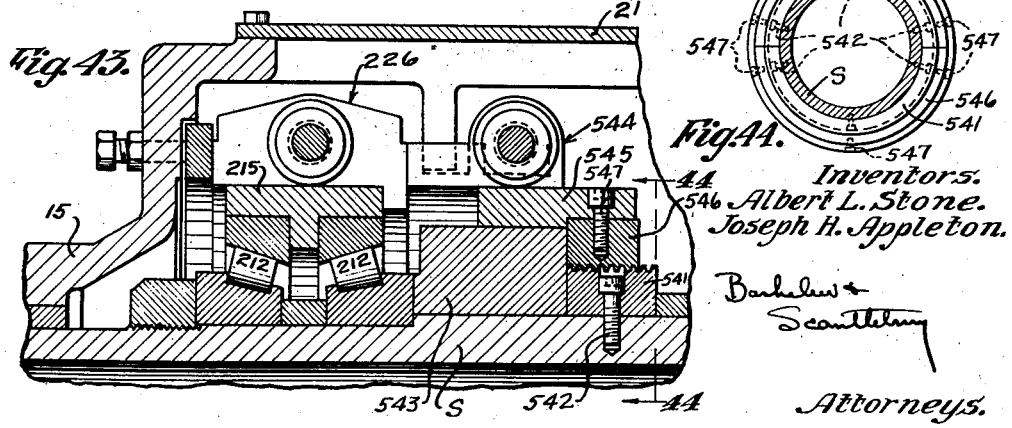
Inventors:
Albert L. Stone.
Joseph H. Appleton.
Attorneys.

Patented Jan. 30, 1945

2,368,499

UNITED STATES PATENT OFFICE 2,368,499

LATHE AND TURRET MILL

Albert L. Stone, Palos Verdes Estates, and Joseph H. Appleton, Los Angeles, Calif., assignors to Hydril Company, Los Angeles, Calif., a corporation of Nevada Application August 1, 1940, Serial No. 349,130

27 Claims. (Cl. 29—27)

This invention relates generally to machines for performing cutting operations which involve relative rotation between work and cutters, and is most advantageously applied to machines wherein, during at least some portion of their cycle of operation, both the work and a cutter, such as a threading hob, are rotated at differential angular velocities and moved relatively axially, whereby a thread may be milled in the work.

While this is in no way limitative, the invention is here shown as embodied in a machine for turning and thread-milling the ends of oilwell pipe or drill stem sections to provide threaded joint-terminals.

In the illustrated embodiment of the invention, the machine is so devised that during a single cycle of operations, milling and turning cuts may be taken sequentially, alternately or in any order desired, whereby, with a single chucking of the work, a number of independent or interdependent operations may be performed—to obvious advantage, but it is to be understood that all phases of the invention are not limited to embodiment in a machine having such capacity.

For instance, certain of the features may be embodied to great advantage in connection with a machine adapted to perform only thread milling operations. But such features additionally play a large part in adapting the machine for performing intermediate or sequential turning or boring operations, wherein the cutter may be stationary and the work, while held against axial movement, may be rotated at much higher speeds than those feasible for thread milling or hubbing.

Characteristically, the work is chucked in a rotary spindle which has a capacity for axial movement, such movement being generated by relative rotation between master or copy threads on the spindle and an engaged nut. With the rapidly rotating threading hob held against axial movement (though in some instances it may be shifted axially in timed relation to the axial and angular movement of the work) and with the work rotated in timed relation to its axial movement, a thread of given characteristics is milled in the work. The hob is provided with annular teeth having no pitch but having the profile chosen for the particular thread being milled, while the effective length of the hob corresponds substantially with the length of the desired thread. Thus, by moving the work axially and at a uniform speed for a distance equal to or slightly greater than the predetermined thread-pitch (or, if the thread is single, the thread lead) while the work is rotated at uniform speed through a single revolution (plus a slight angle for insuring smooth joining of the thread cuts) a complete thread of the desired cross-sectional configuration and length will be milled.

Heretofore, such axial movement of the spindle has been generated by a nut permanently held against axial movement with respect to the spindle-supporting member, in some instances the nut being clamped against rotation while the spindle is threaded therethrough and in other instances both the nut and spindle being rotated, though at different angular velocities. It followed that the only way the spindle could be returned to its starting position for commencement of a new cycle, was by rotating either nut or spindle reversely, necessarily a relatively slow process and, in certain types of automatic machines, calling for extremely complicated mechanisms.

By the same token, it was not feasible to utilize machines so equipped, when milling operations (calling for a slowly rotating, axially moving spindle) were preceded or followed by turning operations, calling for rapid work-rotation and an axially stationary spindle. Nor was it possible to provide a plurality of sets of master threads having different pitch, from which a selected one might be chosen, for with all sets engaged the spindle would be locked against axial and rotative movement.

All the above objectionable characteristics have been overcome and many additional advantages have been gained by one phase of the invention here represented. This involves the use of a leader nut (matched with the master or copy screw on the spindle) which is capable of movement axially with respect to the spindle-supporting member. During milling operations the nut is held against rotation and against axial movement, but upon completion of that operation the nut is released so it and the spindle can be shifted bodily axially (with no screw-thread movement involved) and return the spindle to its starting position. This direct, axial shift may be accomplished rapidly and with the simplest of mechanisms.

Unless the particular milling operation being considered happens to be the last in the cycle, this shift provides a simple, effective way to return the work (chucked within the spindle) to a proper starting position for the next operation, be it milling or turning. This is of great advantage, for not only is the spindle inherently massive and heavy, but the work is normally of considerable weight and bulk, and anything contributing to their ease and speed of handling is of definite merit.

Of course, it is also necessary under these conditions to return the nut to or near to its starting position on the spindle, though it is particularly to be noted that our arrangement has the further advantage of not requiring the nut always to start at the same position on the spindle-threads, thus eliminating one of the critical requirements of other devices. Rather, it is only necessary to return the nut to a position where is is assured that there is sufficient threaded extent of the spindle ahead of it to enable requisite longitudinal axial shift of the spindle to mill a full thread during the succeeding milling operation.

The return of the nut to or near to its starting position on the spindle may be accomplished in a number of ways. In one illustrated embodiment the nut is rotated to thread it along the spindle to starting position, through the use of a torsion spring which acts automatically the instant the nut is released subsequent to the completion of a milling operation. In another embodiment, it is accomplished by rotating the spindle reversely while imposing frictional drag on the nut. The spindle is rotatable reversely at a much higher angular velocity than it is during the milling operation and hence the return of the nut is relatively rapid, and, if the sequence of operation permits, it may be accomplished without waste of time by timing it to happen during a boring or turning operation so everything is in readiness for a subsequent hob-milling operation.

Also, by reason of the provision of releasable means for holding the spindle against axial movement and means for rendering the nut-feed ineffective (so nut or spindle rotation does not produce "lead"), the work may, at times, be rotated at turning speed, so turning or boring operations may be carried out either before or after milling operations—with no loss of time and with no necessity for re-chucking the work.

As a particular and valuable feature, there is included within the invention the provision of novel means for arresting axial movement of the nut at its limits of travel along the spindle without jamming the threads or wedgingly jamming the nut against the adjacent structure, even though the means imparting such movement has a tendency to overrun by reason of tardy actuation of the control or release means.

The features set forth immediately above are of advantage even though only one nut and one copy screw be used. However, the concept of an axially shiftable nut has enabled the utilization of a plurality of sets of nuts and copy or lead screws, any one of which may be quickly selected for and put into operation without interference being created by the unselected sets. There are here shown embodiments which include three such sets, but this showing is not, of course, limitative. The advantage of the ability to select pitches is too obvious to warrant comment.

The feature of non-interference in the case of plural sets, comes about by reason of the fact that, assuming a given set is chosen for a given operation and the nut of that set is therefore held against rotation and axial movement, the nuts of the other two sets are still capable of moving axially with respect to the spindle-support without interference, whether that movement be generated only by the bodily axial movement of the spindle as it is threaded through the chosen nut (as is true in one embodiment) or whether that movement as so generated is modified by relative rotation between the spindle and the other nuts (as is true in another embodiment). Yet in both instances, the restoration of said other nuts to their starting positions is accomplished at the same time as is that of the one nut and without calling for special attention by the operator.

Also as features of novelty, are certain illustrated particularities of the turret, both per se and in combination with the work head, these features extending to turret-control (for instance, the taper attachment thereof, by itself, and in its association with the axially shiftable work spindle) and turret-tool drive control. Also there are features of novelty having to do with drives, clutches, interlocks, etc., but these as well as other objects and features of novelty, are of a nature better to be explained in the following detail description.

It may be said, however, that the general object of the invention is to provide a readily adjustable device of the character described which has wide range of work, great flexibility and speed of operation, and is capable of producing smooth, accurate cuts.

Reference will be made to the accompanying drawings, wherein:

Fig. 1 is a front elevation of a machine embodying the invention;

Fig. 2 is an enlarged section on line 2—2 of Fig. 8;

Fig. 3 is an enlarged section on line 3—3 of Fig. 8;

Fig. 4 is a section on line 4—4 of Fig. 3;

Fig. 5 is a plan view of Fig. 1;

Fig. 6 is an enlarged section on line 6—6 of Fig. 8;

Fig. 14 is a section on line 14—14 of Fig. 12;

Fig. 15 is a section on line 15—15 of Fig. 12;

Fig. 20 is an enlarged fragmentary section similar to a portion of Fig. 11 but showing a variational nut and spindle arrangement;

Fig. 21 is a view similar to Fig. 20 but showing the parts in changed positions;

Fig. 22 is a fragmentary section on line 22—22 of Fig. 20;

Fig. 23 is a fragmentary section on line 23—23 of Fig. 20;

Fig. 24 is a developed section taken on lines 24—24 of Figs. 22 and 23;

Figs. 25, 26 and 27 are schematic views, with relative dimensions distorted to clarify the showing, illustrating the relative movement between nuts and spindle and the association of the stop elements on those members;

Fig. 31 is an enlarged fragmentary section on line 31—31 of Fig. 5;

Fig. 32 is a section on line 32—32 of Fig. 5;

Fig. 36 is a detached front elevation of the turret motor and a variational type of switch therefor;

Fig. 37 shows the structure illustrated in Fig. 36 as viewed from the right of that figure;

Fig. 38 is a top plan view of Fig. 36;

Fig. 39 is an enlarged plan section of one of the switch units and is taken on line 39—39 of Fig. 36;

Fig. 40 is a diagram of wiring which may be utilized in connection with the switch of Fig. 36.

Fig. 41 is a fragmentary section showing a variational type of nut-mounting;

Fig. 42 is a fragmentary section showing another variational type of nut-mounting;

Fig. 43 is a fragmentary section showing still another variational type of nut-mounting; and Fig. 44 is a reduced section on line 44—44 of Fig. 43.

Figure 11:
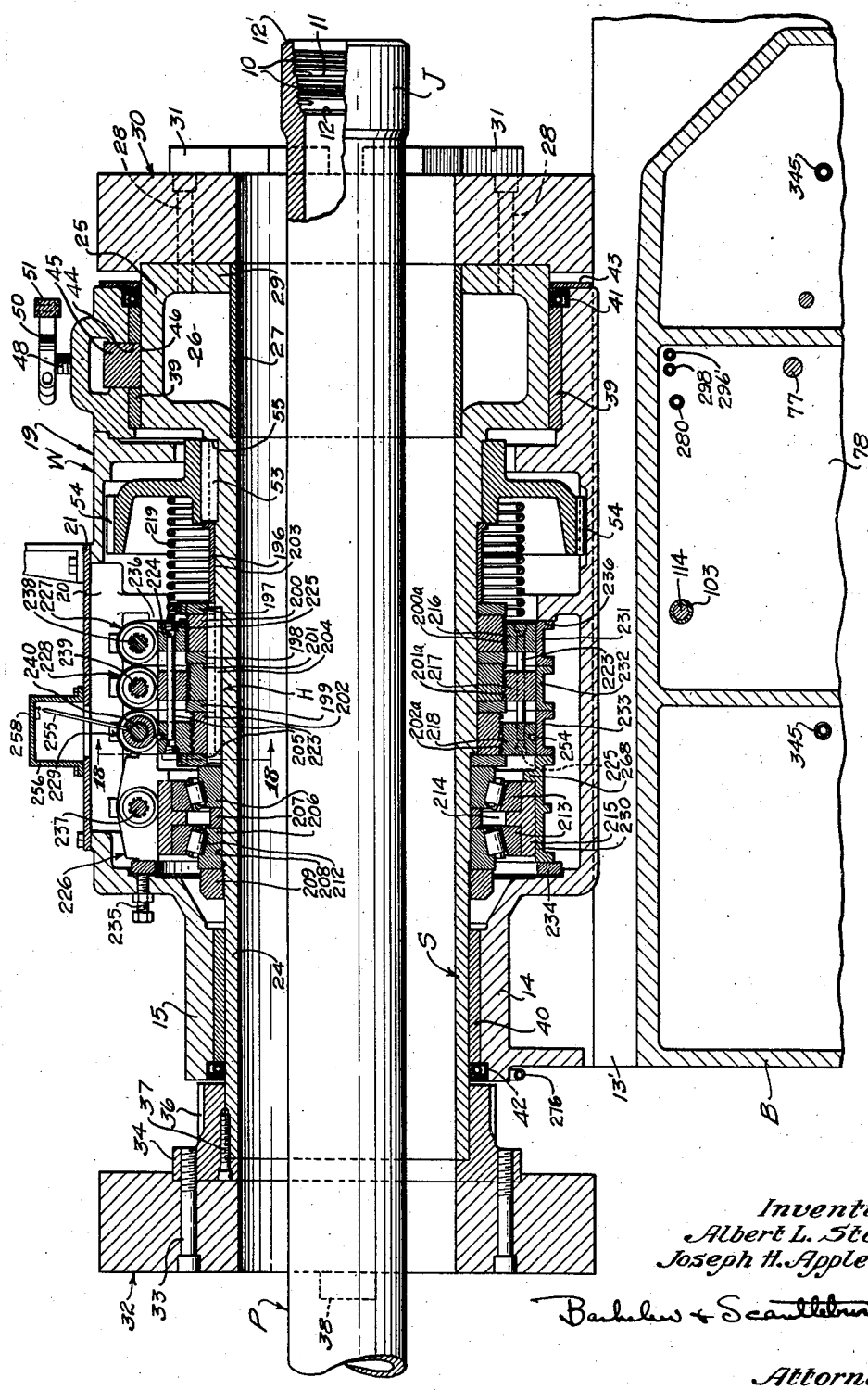
Fig. 11 is an enlarged vertical section of the work head, taken on line 11—11 of Fig. 7.

As has been said above, the invention is capable of embodiment in machines for accomplishing a great variety of work, though it is here illustrated as being set up for forming a joint-thread and joint shoulders on well pipe. Thus, merely for illustrative purposes and not as indicating limitations on the invention, the work P (Figs. 1 and 11) is shown in the form of drill pipe having an externally upset box J. In Fig. 11 this box is shown in completed form as it will appear after all turning and milling operations have been performed thereon by the illustrated machine. Thus, it has the two-step and slightly tapered threads 10 with an annular shoulder 11 therebetween, an internal conical shoulder 12, and an external conical shoulder 12'. This represents a joint-box corresponding in principle to the subject-matter of Patent No. 1,932,427, issued October 31, 1933, to Frederick Stone on Well pipe joint.

The machine may be tooled up to accomplish all roughing cuts, finished shoulder cuts and thread milling or hobbing cuts—all with a single chucking of the work, but in the following description no attempt will be made to describe all these different cuts as accomplished in a single cycle of operation, as explanation of only one or two of them will suffice for the instant purpose.

Since, in the illustrated set-up, the work is performed on the box end of a joint member, the turning operations are mainly of a boring nature, but it will be understood the machine is as well adapted for forming external threads and therefore "turning" and "boring," as used in the specification, may be considered as synonymous.

Figure 7:
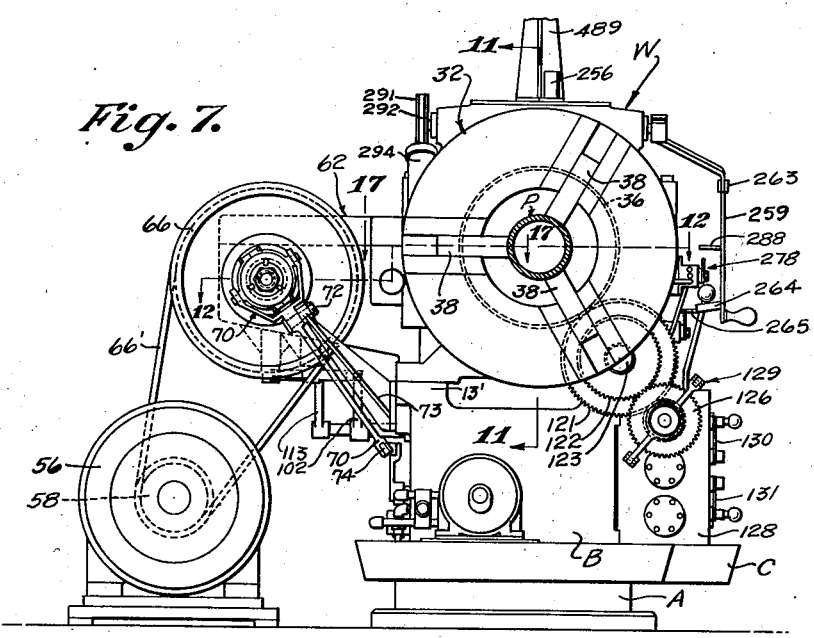
Fig. 7 is an end elevation of the machine as viewed from the left of Fig. 1.
Figure 8:
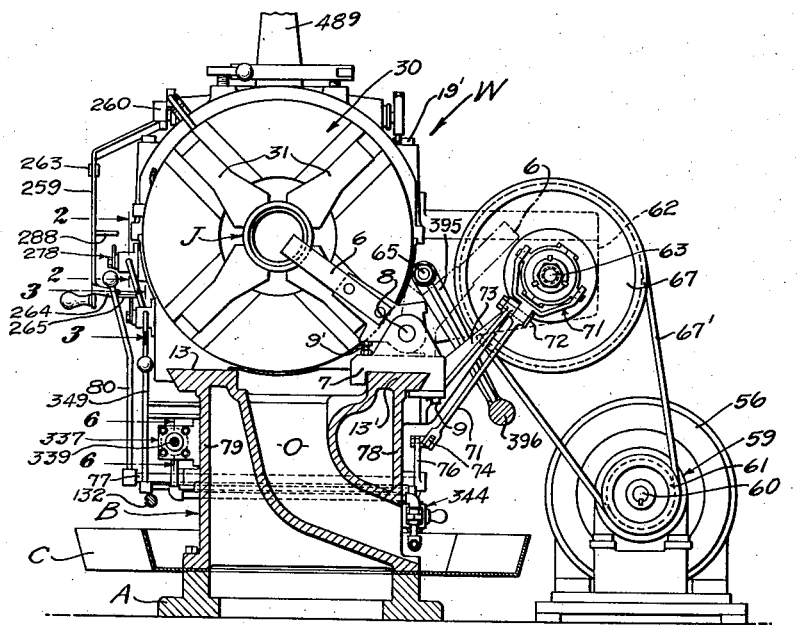
Fig. 8 is a section on line 8—8 of Fig. 1.

Clamped between base casting A and bed casting B, is an oil pan C, there being an oil and cuttings chute O located at the cutting zone and extending from between the bed ways 13, 13' to the oil pan, all as clearly shown in Fig. 8.

The work head W is mounted at one end of bed B, while the tool head T is mounted on ways 13, 13' at the other end of the bed, being movable longitudinally of the bed toward and away from the work head.

We will first describe the generalities of the work head and its rotative drive with reference to the means for axially shifting the spindle of that head, delaying description of the details until other portions of the machine have been generally oriented.

The tubular work spindle S is mounted for rotation and limited axial endwise movement in work head W, this head comprising lower and upper spindle-supporting castings 14 and 15, respectively. The lower casting is bolted at 16 to ways 13 and 13' (Fig. 14) the dove-tail overhang 17 and side plate 18 aiding in the lateral positioning of the casting on the bed. The upper casting 15 is bolted to casting 14 as at 19' (Fig. 14), the two castings together forming a spindle housing and support generally indicated at 19. There is a central opening 20 through the top of the upper casting adapted to be closed by a detachable cover plate 21, and at opposite sides of this opening are provided housing-bosses 22 and 23.

Spindle S includes an elongated, central barrel 24 at one end of which is an enlarged, cylindrical head 25, the bore 26 of the head preferably being closed off by sleeve 27. Bolted at 28 to head flange 29 is chuck 30, here shown as being of the four-jaw type, the individual jaws being indicated more or less conventionally at 31, though this showing of a particular type of chuck is not to be considered as limitative on the invention. The enlargement of the end of the spindle to form head 25 not only provides for obviously advantageous additional bearing surface for the spindle within the work head housing but also (and particularly in connection with the relatively massive chuck attached thereto) has the advantage of providing a relatively large inertia mass which eliminates jerkiness and thus contributes to smooth rotation of the work during the cutting operations thereon, and thus, in turn, does much to insure smooth, even cuts.

Preferably, though not necessarily, there is a second chuck 32 fixed to the opposite end of the spindle, the attachment here being shown as through bolts 33 to flange 34 on gear 36, which gear is keyed at 37 to the spindle end (Fig. 11).

Chuck 32, is, of course, in axial alinement with chuck 30 and is here shown as having three jaws 38, though this is not limitative in any sense. In Figs. 1 and 11, pipe P is shown as chucked within the work spindle at 30 and 32 so spindle and pipe are in axial coincidence and so box J projects somewhat beyond chuck 30. To position the work properly within the chucks, so far as endwise location of box J is concerned, we provide a stop-bar 6 (Figs. 1 and 8) pivoted to bracket 7 at 8. The bracket is slidable along way 13' to any desired position of adjustment and may be clamped in adjusted position by bolt 9. Before the work is introduced to the spindle, bar 6 is swung to the full line position of Fig. 8, adjustment 9' limiting the extent of this pivotal movement and insuring that the bar will lie in the path of pipe P when it is thrust into the spindle. After the work is chucked, bar 6 is swung clear—that is, to the dot-dash line position of Fig. 8.

Bushings 39 and 40 provide for the rotational bearing of the spindle within the housing casting at longitudinally spaced points, the spindle being also capable of limited endwise or axial movement through these bushings. Oil seal assemblies 41 and 42 are conventionally indicated at the external ends of bearings 39 and 40, respectively, while an oil seal retainer ring for seal 41 is indicated at 43.

The bearing for spindle head 25 is preferably made radially adjustable to a certain extent, so a variational frictional drag may be placed on the spindle to impose a steady braking pressure to prevent the cutter from driving the work during climb milling.

Figure 16:
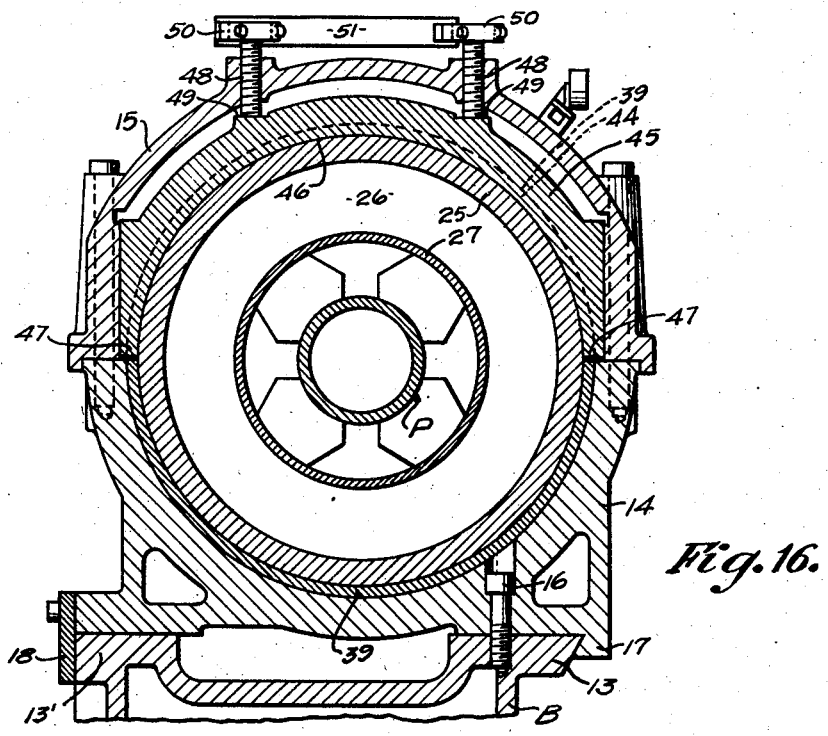
Fig. 16 is an enlarged fragmentary section on line 16—16 of Fig. 5.

For this purpose, bearing sleeve 39 is centrally slotted at 44 throughout its upper half and a bearing shoe 45 (Fig. 16) occupies this slot and has its lower, arcuate face 46 in bearing engagement with spindle head 25. The downwardly facing ends 47 of the shoe are vertically spaced from the underlying structure so the shoe is capable of vertical adjustment and may be pressurally engaged with the spindle head with varying effective force. For instance, pressure screws 48 are threaded through casting 15 into engagement with shoe-shoulders 49 which are spaced equally from opposite sides of the vertical axial plane of the spindle. Levers 50 (Figs. 5 and 16) are clamped to the upper ends of screws 48 and are connected by link 51, one of the levers being extended to form a handle 52, the connections being such that manipulation of one lever to actuate its clamping screw causes coincident actuation of the other lever, it following that equalized pressure may be adjustably applied to shoe 45.

Keyed at 53 to spindle S is a drive gear 54 (Figs. 11 and 17), this gear being snugly held against head shoulder 55 by means to be later described.

Rather than continuing with a description of the nut and clamp assembly associated with the spindle, we will now describe the mechanism and its control whereby rotative force is applied to the spindle (which force, through said nut assembly, also generates the axial movement of the spindle) and the drive through that spindle to means which may be employed for shifting the tool head T in timed relation with spindle movement (both rotary and axial) and we will also describe generally the illustrated tool head so there may be a basis for the subsequent discussion of the relative positions of the work head and the tool carried thereby.

A variable speed, reversible motor 56 is controlled by any suitable switch (not shown), the motor shaft 57 carrying pulley 58 (Fig. 5). Shaft 57 extends to a speed reducer conventionally illustrated at 59 which, for example, may establish the speed-ratio of in-put shaft 57 and output shaft 60 in the neighborhood of 160 to 1. Output shaft 60 carries pulley 61 which normally will be of approximately the same diameter as pulley 58.

Figure 12:
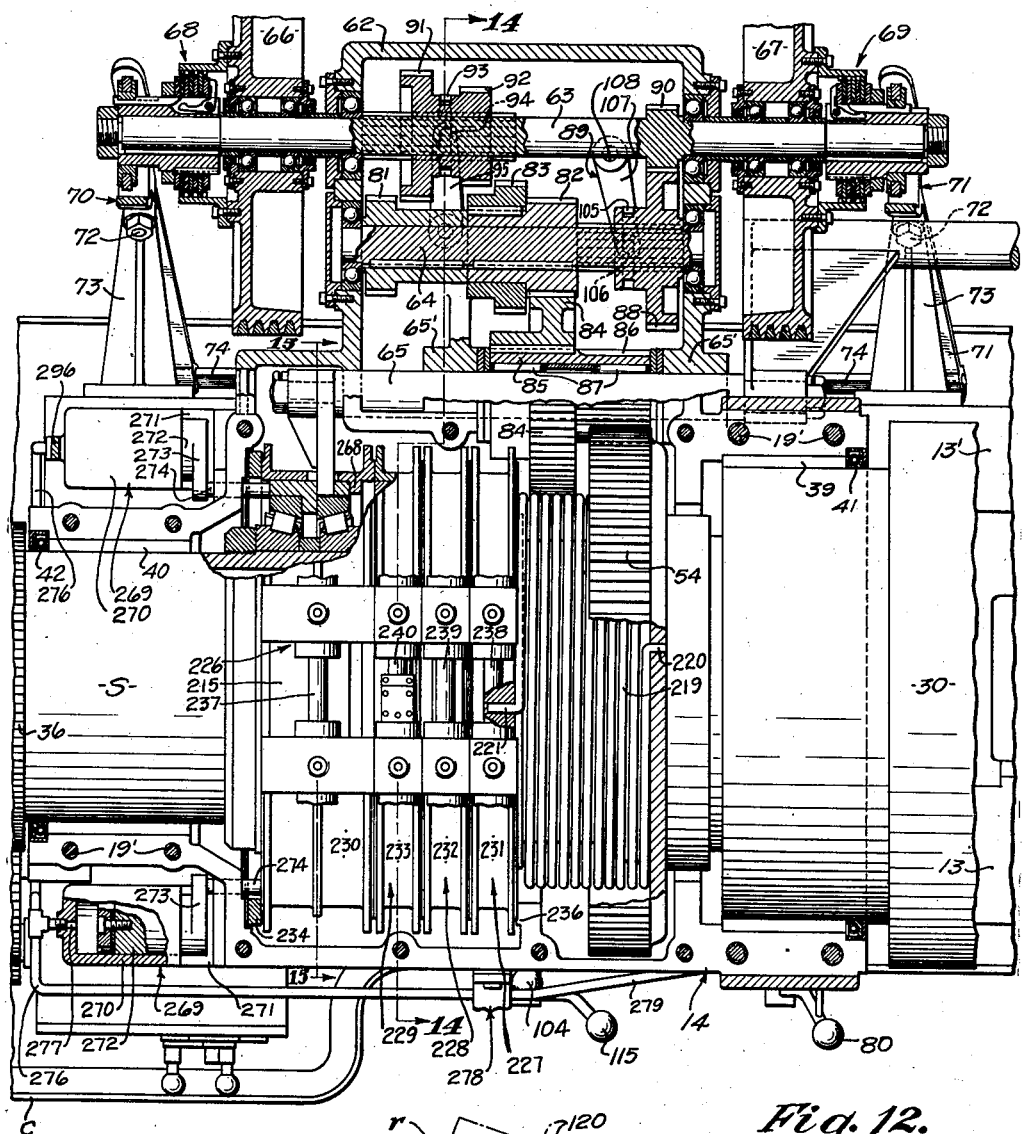
Fig. 12 is an enlarged horizontal plan section, partly in elevation, taken on line 12—12 of Fig. 7.

A gear housing 62, preferably integral with casting 14 (Fig. 14) provides bearing for main shaft 63 and jack shaft 64; the pinion shaft 65, which also extends through this housing, being supported for endwise movement at its opposite ends in housing bosses 65' (Figs. 12 and 14). Exteriorly of housing 62 and mounted for free rotation on the opposite end of shaft 63, are the pulleys 66 and 67 which are belted at 66' and 67', respectively, to pulleys 58 and 61. Individual clutches for pulleys 66 and 67 are indicated at 68 and 69, respectively, these clutches being selectively operable to clutch either one of these pulleys to shaft 63, it being obvious that, with the motor running at uniform speed, pulley 66 will have much higher angular velocity than will pulley 67 and, if clutched to shaft 63 will drive that shaft at much greater speed than will pulley 67 when it is clutched to the shaft. It may be stated at this point that clutch 68 may be considered the high speed or turning clutch, while clutch 69 may be considered as the low speed or milling clutch.

It is essential that when one of these clutches is engaged, the other will be disengaged, the interconnecting and control mechanism being such as will insure this condition. The control mechanism also is such that it is possible to unclutch both pulleys 66 and 67 so they rotate idly on shaft 63, allowing the latter to remain stationary.

The clutch actuating mechanism includes shifter yokes 70 and 71 applied in a usual manner to clutches 68 and 69, respectively, these yokes each being pivoted individually at 72 on brackets 73 which are carried by the work head casting. The distal ends of yoke 70 and 71 (Fig. 9) are connected by link 74 so the yokes move in unison, a clockwise movement, as viewed in Fig. 9, of the yokes applying one clutch and disengaging the other clutch and counterclockwise movement of the yokes reversing the clutch condition. A drag link 75 extends from link 74 to crank 76 on rock-shaft 77, the latter extending through the apron portions 78 and 79 of bed B (Fig. 8) to the forward face of the machine (Fig. 1), there being provided a clutch control lever 80 at the outer end of the rock shaft (Fig. 1). With lever 80 in the position illustrated, the yokes, their interconnections, and the clutches will be in the positions shown in Figs. 9 and 12, the milling clutch 69 being engaged and turning clutch 68 being disengaged. When lever 80 is swung in a counterclockwise direction (as viewed in Fig. 1) to a position where it is angularly displaced to the left of the vertical axial plane of shaft 77 to an extent equal to that which it is displaced to the right in Fig. 1, clutch 69 will be disengaged and clutch 68 will be engaged. When lever 80 occupies a position intermediate these two extremes, both clutches will be disengaged, and the lever may be swung through a small angle to either side of the vertical position, but short of the extreme positions, without engaging either of the clutches.

With it thus established that a wide differential in turning and milling speeds may be imparted to shaft 63 by selectively engaging clutch 68 or 69, it still becomes highly desirable to provide means for giving additional range to turning and milling speeds as finally imparted to spindle S, and there is therefore illustrated a change-speed gearing between those elements, which gearing may be selectively actuated whether pulley 66 or pulley 67 happens to be the drive member for shaft 63. The change-speed gearing includes gears 81 and 82 which are keyed to shaft 64 and held against endwise movement therealong, while gear 83 is keyed to and held against axial movement with respect to gear 82 and hence is likewise, in effect, keyed to shaft 64. Gear 82 constantly meshes with gear 84 which, in turn, is keyed and held against axial movement with respect to the hub 85 of pinion 86, the latter being mounted for free rotation on shaft 65 through the medium of rollers 87. Pinion 86 is held against axial movement and is constantly in mesh with spindle gear 54, though the face of gear 86 is wider than that of gear 54 so the pinion and spindle gear may be constantly in mesh throughout the limited axial movement of the spindle, as will be described. Gear 88 is keyed to but slidable axially along jack shaft 64, a shifter fork 89 being utilized for sliding it axially into or out of mesh with the relatively small pinion 90 which is integral with shaft 63.

Integral gears 91 and 92 are keyed to but movable axially along shaft 63, being shiftable to the left, as viewed in Fig. 12, to engage gear 91 with gear 81, or shiftable to the right to engage gear 92 with gear 83. Inherently, gear 91 may not be engaged with gear 81 as long as gears 92 and 83 are in engagement, or vice versa, but special means must be provided to prevent gear 88 being in mesh with pinion 90 at any such times as gears 91 and 92 may be in mesh with their mating gears, or vice versa. However, before proceeding to a description of the interlock which prevents such accidental engagement of two interfering sets of gears, it is to be noted that, starting with pinion 90, gears 92 and 91 are progressively larger in diameter. Therefore, assuming shaft 63 be revolving at constant speed, spindle gear 54 may be given any one of three speeds, namely, low speed when gears 88 and 90 are meshed, high speed when gears 91, 81 are in mesh, and intermediate speed when gears 92 and 83 are in mesh. Or, of course, if gears 91 and 92 be in the position of Fig. 12 and gear 88 be moved out of mesh with pinion 90, the drive between shaft 63 and spindle S is interrupted.

In describing the shifter mechanism for gears 91—92 and gear 88, particular reference will be made to Figs. 9, 12, 13 and 14. From Fig. 14, it will be seen that shifter fork 93 which engages sliding, integral gears 91—92, is pivoted at 94 on horizontal crank arm 95, the latter being pinned to vertical rock-shaft 96 which has bearing in housing-hub 97. Pinned to the lower end of shaft 96 is horizontal crank 98 which has universal joint connection 99 with link 100 (Figs. 13 and 14, and remembering that Fig. 13, though a section taken on line 13—13 of Fig. 14, is rotated to the aspect of Fig. 12). Link 100 has universal-joint connection 101 with crank 102 (Figs. 13 and 9) this crank being pinned to horizontal tubular shaft 103 which extends through the bed of the machine to the forward face thereof and carries at its outer end a control handle 104. When this control handle extends vertically, as in Fig. 1, gears 91 and 92 are out of mesh with all gears on the jack shaft, that is, they occupy the positions of Fig. 12. If lever 104 be swung to the right in Fig. 1, crank 102 is swung in a counter-clockwise direction as viewed in Fig. 9 or in a clockwise direction as viewed in Fig. 13. This movement, through link 100, swings crank 98 and shaft 96 in a counter-clockwise direction as viewed in Fig. 13, rocking fork 95 in a counter-clockwise direction as viewed in Fig. 12 and thus shifting gear 91 into mesh with gear 81. It will be seen that by swinging lever 104 to the left in Fig. 1, fork 95 will be swung in a clockwise direction as viewed in Fig. 12 and gear 92 will be engaged with gear 83.

The shifter 89 for gear 88 comprises a fork or yoke 105 similar to yoke 93 (see dotted lines in Fig. 14) pivoted at 106 to crank 107, the latter being pinned to vertical rock shaft 108 which is journalled in casing hub 108' (Figs. 12 and 14). Crank 109 is pinned to shaft 108 and has universal joint connection 110 with link 111, the latter having universal joint connection 112 with crank 113 on shaft 114. This shaft is journalled within the bore of tubular shaft 103 and extends through the forward face of the machine, at which point it carries a control handle 115. It will be seen that the shafts 103 and 114 may, at times, be rotated independently about coincidental axes of rotation.

When control handle 115 is in the position of Fig. 1, gear 88 is meshed with pinion 90 (Fig. 12), it following that the drive to spindle 84 is "low speed" even within the milling speed range as established by the engagement of clutch 69 (a previously designated condition). If control lever 115 be swung in a counter-clockwise direction, as viewed in Fig. 1, to a vertical position, shaft 103 and crank 113 will be swung in a counter-clockwise direction as viewed in Fig. 13, this movement, through link 111, swinging crank 109 and shaft 108 in a clockwise direction as viewed in Fig. 13. This imparts clockwise movement to crank 107, as viewed in Fig. 12, and hence shifts gear 88 out of mesh with gear 90.

Figure 9:
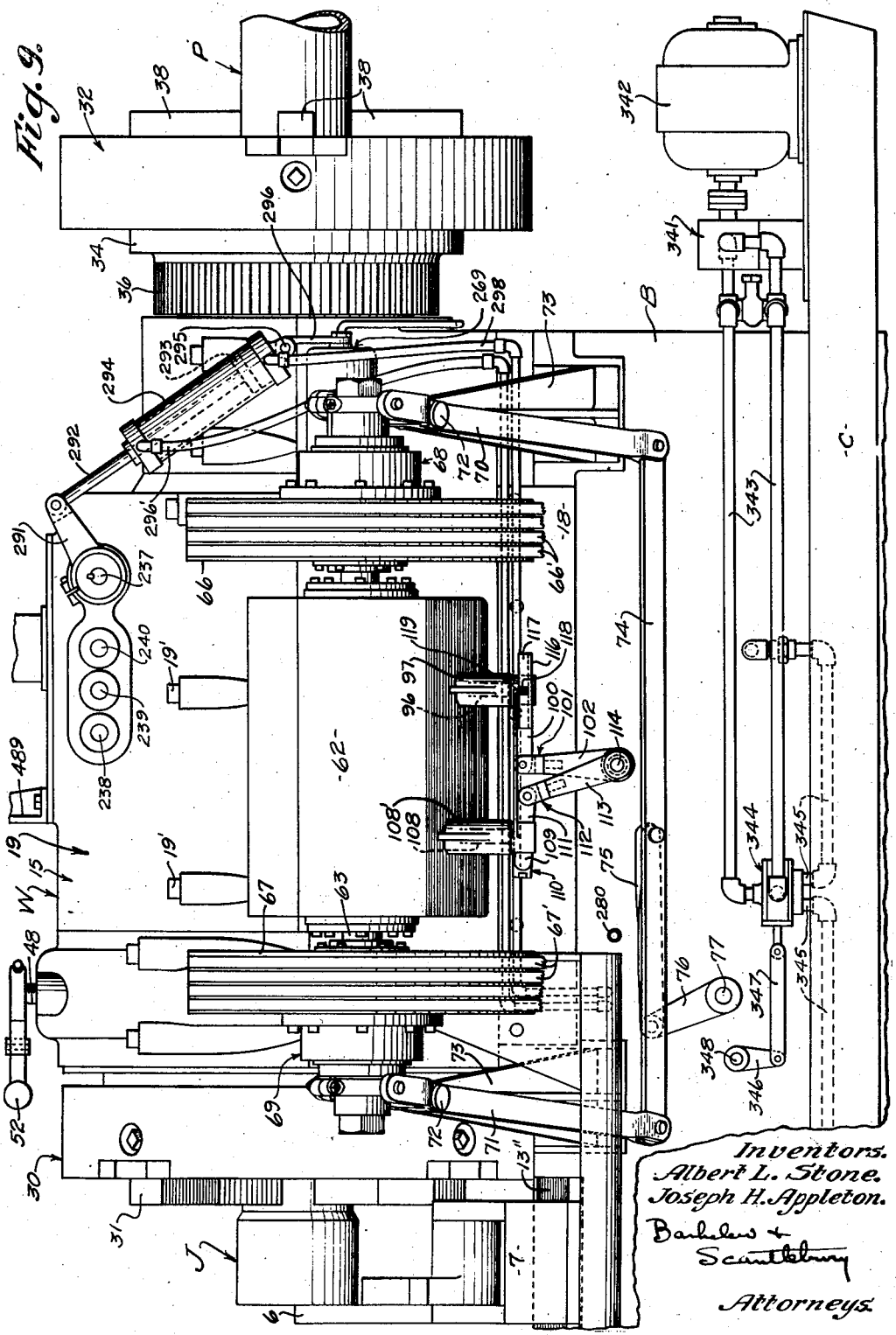
Fig. 9 is an enlarged fragmentary elevation of the work head, looking in the direction of arrow 9 in Fig. 5.
Figure 13:
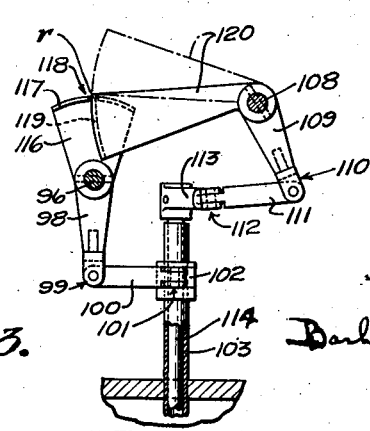
Fig. 13 is a section on line 13—13 of Fig. 14; being rotated through 90° into the aspect of Fig. 12.

As has been said, it is important that gears 91, 92 be not shifted into engagement with either of their companion gears on jack shaft 64 while gear 88 is engaged with gear 90, or vice versa. The interlock whereby such shifting is prevented, will now be described. Referring to Figs. 9 and 13 crank 98 is extended beyond its axis of oscillation to provide a segmental blade 116 which has at its distal end an upturned flange 117 which is arcuate as viewed in plan (Fig. 13). A central notch 118 (Fig. 9) is cut through the flange and, when the parts are in the position of Fig. 13, this notch is adapted to receive the down-turned flange 119 (Fig. 9) formed on the angular extension or blade 120 of crank 109, flange 119 being arcuate as viewed in plan. As is apparent, flanges 117 and 119 are concentric with shafts 96 and 108, respectively, the radii of curvatures intersecting at point r in Fig. 13. With crank 98 and blade 116 in the positions illustrated in Fig. 13 (this meaning that gears 91 and 92 are necessarily out of mesh with their companion gears) it will be seen that crank 109 may be oscillated without interference, flange 119 merely traversing the notch 118 at r, it thus being possible freely to engage or disengage gear 88 with respect to pinion 90. But so long as flanges 119 and 117 are thus engaged, by way of notch 118 (and this engagement exists until crank 109 has been swung a sufficient distance to disengage gear 88 from gear 90) it will be seen that crank 98 may not be swung in either direction, since the notch-defining walls of the flange on blade 116 will engage the flange 119 on blade 120.

However, when crank 109 is swung to a position clearing flange 119 from flange 117 (dot-dash line in Fig. 13) and in which case gear 88 will be disengaged from pinion 90, crank 98 may be oscillated in either direction to engage gears 91 or 92 with their mating gears on the jack shaft. However, the moment notch 118 is moved out of register with flange 119, flange 117 will prevent blade 120 from returning toward the full line position of Fig. 13, and hence crank 109 is held in a position where it is assured that gear 88 cannot be reengaged with gear 90.

We have heretofore spoken of gear 36 as being keyed to spindle S at a point between chuck 32 and the left hand end of the work head housing.

as viewed in Fig. 1. This gear is utilized for transmitting movement to tool head T in timed relation to the movement of spindle S. We now describe that driving connection.

Integral gears 121 and 122 are mounted for rotation on stub shaft 123 carried in casting-boss 124. Gears 121 and 122 mesh, respectively, with gears 125 and 126 on shaft 127 which extends into gear box 128. Gears 125 and 126 are capable of being selectively keyed to shaft 127, control mechanism 129 being actuatable to accomplish the selection and thus establish which of said gears becomes the effective input drive for the gears of box 128. The details of this control mechanism and of the gear arrangement within box 128 are not shown and need not be described since they may be of any suitable and known construction. It will suffice to say that by actuation of control 129 and control levers 130, 131 the angular velocity of rotary feed bar 132 may be varied within very wide limits even though gear 36 has constant angular velocity.

Feed bar 132 has a long keyway 133 at its free end, the keyway taking key 134 (Fig. 32) by which worm 135 is rotatably driven by bar 132, though the worm is slidable axially therealong. Worm 135 lies within the cavity 136 of apron 137, the latter being secured to and depending from carriage D of tool head T. The worm is held against endwise movement within cavity 136 by its end-engagement with bosses 135' on the end walls of the apron.

Apron 137 is directly attached to the main or longitudinal slide member 138 of carriage D, this member 138 being adapted to slide longitudinally of bed B to and fro over ways 13 and 13' (Figs. 31 and 32) being held against movement transversely of the bed by the dove-tail interfit 139 with one side of way 13 and the gib 140 interposed between the other side of said way and the depending projection 141 on the main slide 138. Also, as a laterally positioning and clamping member, is a triangular gib 142 between the undercut face 13" of way 13' and depending flange 143 on the main slide, the gib being supported from beneath by flange 144 on bracket 145, which latter is bolted at 146 to slide-flange 143.

A shaft 147 is journalled in apron 137 (Fig. 32) and carries at its inner end a pinion 148 which meshes with rack 149 secured to the underside of way 13. It is obvious that by rotation of shaft 147 and pinion 148, carriage D will be caused to slide longitudinally of bed B over ways 13, 13'. There will later be described means whereby this shaft 147 may be rotated either manually or through the medium of worm 135, in the latter case the movement of the carriage being in timed relation with respect to the angular velocity and hence to the rate of longitudinal threaded movement of spindle S, but for the time being it will suffice to make the point that the carriage is capable of such a shift.

The tool-support on carriage D is generally in the nature of a turret T' mounted for rotation about a vertical axis on cross feed slide 150, which latter is supported on main slide 138 for movement in a direction normal to the longitudinal axis of bed B. This turret and its mounting, together with the arrangement of the tools and the drive of those tools from motor M, are generally of the nature disclosed in the co-pending application entitled Turning and milling machine, filed October 25, 1938, Albert L. Stone et al., Ser. No. 236,874, now Patent No. 2,222,206, issued November 11, 1940, which patent broadly claims certain of the features. However, in order that additional features may be pointed out, the structure of the herein-illustrated turret and its mounting will be described, though certain details will be left for discussion at a later point.

Cross-feed slide 150 is adapted to slide transversely of main slide 138 on ways 151 and 152 (Fig. 28), being confined to straight-line movement by dove-tail interfit 153 and gib 153' at opposite sides of way 151, and by gib 154, of approximately triangular cross section, positioned between the under-cut face 155 of way 152 and depending flange 156 on slide 150. Gib 154 is supported from beneath by plate 157 which is bolted to the underside of flange 156.

Bolted at 158 to the upper face of slide 150, is the turntable support 159 which is in the form of a ring with an external annular groove 160. The base of turntable 161' of spindle housing 161 is rotatable on top support 159 and has an external annular groove 162. A stud 163, coaxial with grooves 160 and 162, centers base 161' and support 159. A clamp ring 164 is adapted to clamp turntable 161', and hence the turret, to the support 159 when the turret is shifted to a selected position of angular adjustment, but the mechanism of this clamping ring, as well as of positioning pin 165 will be left for later discussion.

Figures 28, 29, 30:
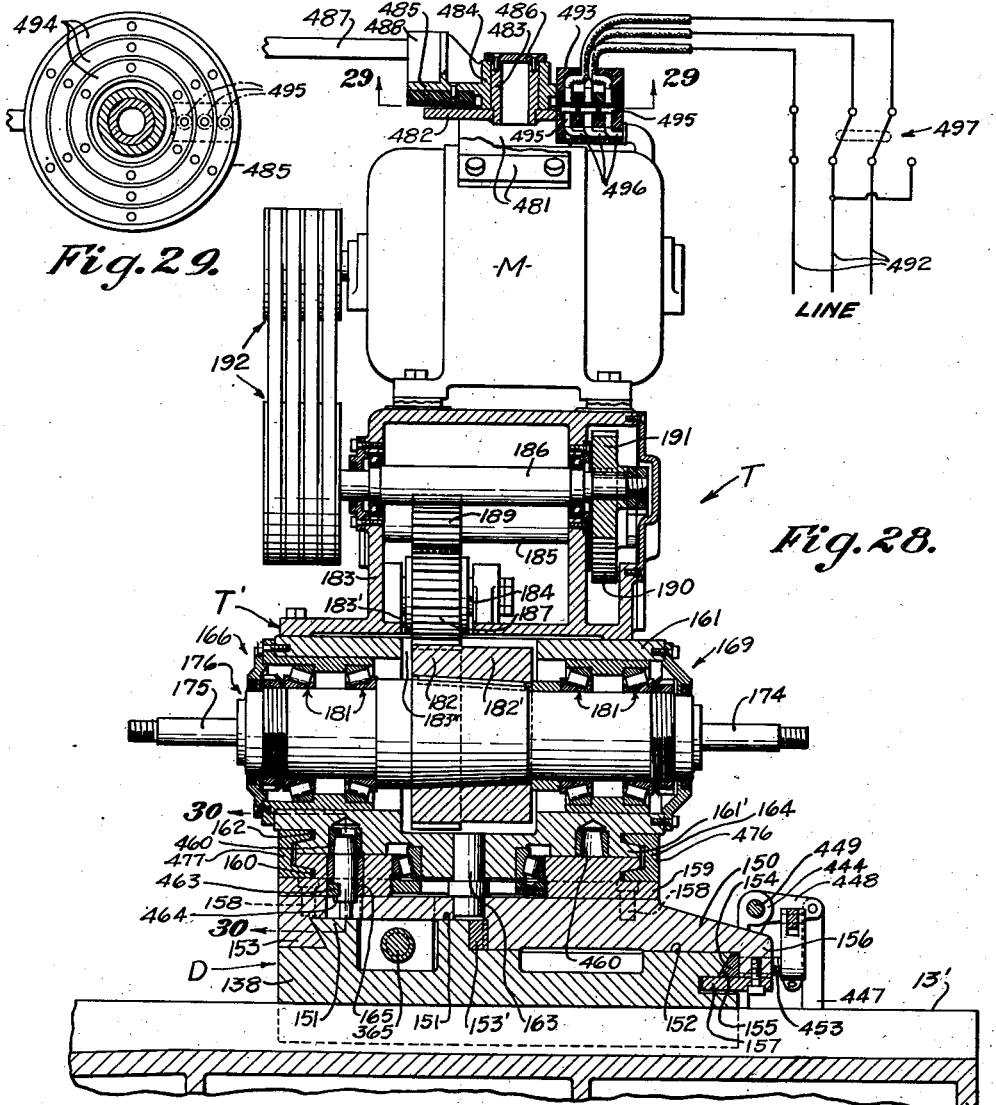
Fig. 28 is a vertical section, partly in elevation, taken on line 28—28 of Fig. 10.
Fig. 29 is a section on line 29—29 of Fig. 28.
Fig. 30 is a section on line 30—30 of Fig. 28.

The spindle housing 161 of turret T' is arranged to have a plurality of tool stations 166 through 171, inclusive, arranged about its periphery (Figs. 1, 5 and 28). Any tools suitable to perform the desired operations may be provided at these stations, the turret being rotatable to bring the tools selectively and sequentially into axial parallelism with the axis S' of the spindle S. Then, by shifting cross slide 150, the axis of the particular tool which is at the effective station (that is, facing directly towards the work spindle) may be brought into coincidence with the work spindle axis or it may be shifted so the tool axis lies at one or the other side of said axis S', depending upon the nature of the work to be done.

If both milling and boring operations are to be performed, one or more of the tools will be rotatively driven, and one or more of them will be stationarily held by the turret when in effective position. We have illustrated only three tools, two of them being rotatively driven and the other being stationarily mounted on the turret. In this particularly case, though it is not limitative on the invention, the two rotary tools are in the nature of a reamer 172 and a threading hob 173 mounted on the opposite ends 174 and 175 of "live" spindle 176, these cutters being at stations 169 and 166, respectively, with hob 173 in effective position. The stationary tool is represented as a boring bar 177 provided at station 167, while the other stations are illustrated as unoccupied in order to simplify the showing. Although in the illustrated embodiment only two rotatable tools are shown, in said aforementioned application Ser. No. 236,874 there is shown an arrangement whereby more than two rotatable tools may be mounted in the turret, and that same situation may, of course, be brought about in connection with the embodiment of the instant showing by substitution of suitable tool-driving mechanism.

Reamer 172 is of "two-step" configuration to give a cut which will reproduce the step formation shown within box J of work P. This tool is operated by rotating it rapidly against the inner periphery of box J while the work is revolving at milling speed and while spindle S is held against axial movement. The tool is positioned for cutting by rotating turret T' to bring the reamer into the position occupied by hob 173 in Fig. 1, then moving carriage D toward the work head W until the reamer is at the proper longitudinal position within the box, and then moving the cross slide transversely to engage the reamer with the box wall.

Cutter 173 is a thread-bobbing mill having two-step characteristics and having two series 178 and 179 of annular cutter teeth having no pitch but having the profile configuration of the thread to be milled in box J, the length of the cutter series being approximately equal to the length of the finished thread 10.

Cutters 180 on boring bar 177 (Figs. 1 and 5) may be considered as turning or boring tools adapted to cut shoulders 11 and/or 12 in predetermined spaced relation and in predetermined relation with respect to the two-step thread. A simialr cutter (not shown) but adapted to cut the external shoulder 12' in predetermined relation with the other shoulders and the thread, may be provided at one of the other tool stations. Likewise, other roughing and finishing tools may be provided on the turret whereby the box J may be completely machined with but one chucking and with a single step-by-step rotation of the turret T'.

Referring once more to Fig. 28, it will be seen that "live" spindle 176 is mounted for rotation in and held against longitudinal movement with respect to spindle housing 161 by the bearing assemblies generally indicated at 181, there being a gear 182 keyed to the spindle between the bearings. Preferably this gear is extended longitudinally at 182' to provide additional inertia mass for steadying the tool spindle, for the purposes fully set forth in said aforementioned application Ser. No. 236,874, now Patent No. 2,222,206, issued November 11, 1940.

Gear housing 183 is bolted on top spindle housing 161, there being registering openings 183' and 183'' through the bottom and top of the respective housings. Shafts 184, 185 and 186 are mounted for rotation in housing 183, shaft 184 carrying gear 187 which extends through openings 183', 183'' into mesh with spindle gear 182. Gear 187 also meshes with gear 189 on shaft 185, the latter carrying a gear 190 which meshes with gear 191 on shaft 186. Shaft 186, and hence spindle 176, are driven through a belt-and-pulley connection 192 by reversible motor M. A preferred, though not limitative, method of supplying current to and controlling the motor, will be described later.

For the time being, we will also disregard the taper attachment whereby the turret is moved transversely in timed relation to the axial movement and angular velocity of spindle S. This taper attachment is not necessary in milling straight threads and it will be more simple first to consider the operation of the device without complicating it by reference to the taper.

We wish to make it clear that while we have described the turret in some detail and, in fact, will go on later to described it even somewhat more in detail in order that certain definite and advantageous relationships may be pointed out, certain fundamentals of the invention do not require that the tool carrier be of the turret type or that it have the stationary tools mounted on the same head that carries the "live" or rotating tools. On the other hand, there are certain very beneficial results flowing from the particular mounting and association of the several tools both with each other and with respect to the work head.

We will now return to a discussion of the means for moving the spindle S, and hence work P, axially with respect to the work head, or, expressed otherwise, with respect to the spindle supporting structure and with respect to the tool head. For this purpose, we will initially refer particularly to Figs. 11 through 17.

The assembly generally indicated at H is mounted on and fixed against rotation and endwise movement with respect to spindle S. It can best be followed by reference to Figs. 11 and 17, though it will be understood the spindle and assembly occupy different positions with respect to the work head housing in Fig. 17 than they do in Fig. 11. Assembly H includes sleeve 196, spacer rings 197, 198 and 199 and leader or copy screw rings 200, 201 and 202, the sleeve, spacers and leader rings being mounted on spindle step 203, and the spacers and leader rings being keyed to the spindle at 204 (Figs. 11 and 14). Assembly H also includes spacer ring 205, bearing races 206 and race-spacer ring 207, all mounted on reduced-diameter step 208 of the spindle, ring 205 being keyed to the spindle. A retainer and clamping nut 209 is threaded on the spindle to exert endwise pressure on the entire assembly H, said assembly and gear 54 thus being clamped against endwise movement with respect to the spindle between nut 209 and spindle shoulder 55, it being noted that clearance 210 exists between spacer ring 205 and spindle shoulder 211 so said shoulder may not interfere with the proper clamping of the spindle-carried elements.

Conical roller bearing and cage assemblies 212 are interposed between races 206 and floating races 213, the latter being arranged at opposite sides of the central internal, annular flange 214 on spindle brake drum 215. Due to the conical and oppositely inclined characteristics of the roller bearing assemblies and races, it will be seen that while the drum is free to rotate with respect to the spindle, it is held against axial movement with respect thereto.

Leader or master screw rings 200, 201 and 202 have individual master screw sections or threads 200a, 201a, 202a, respectively, these threads being of any desired pitches, depending on the characteristics of the threads which are most frequently expected to be milled on any one machine. Of course, if occasion arises for cutting threads of pitches other than those represented, proper leader screws with the desired threads may be substituted for one or all currently installed screws. Further, as was stated at the outset, certain aspects of the invention do not necessarily include a plurality of such screws, for great advantage may be secured with the use of only one when that one is associated with other control mechanisms to be described.

Though this is of course not limitative, the threads 200a, 201a and 202a, as illustrated, are scaled to represent, respectively, pitches of 6, 4, and 3, that is one revolution of the spindle will individually advance the nuts mated with those threads ⅙", ¼" and ⅓", respectively.

The threads of master nuts 216, 217 and 218 mate with threads 200a, 201a and 202a, respectively, and it will be seen that if the spindle is rotated while any one of them is clamped against rotation and axial movement, the spindle will be threaded through that nut and will thus be shifted axially of the work head housing in timed relation to the angular movement of the spindle. For instance, if nut 218 (3 pitch) be clamped in the position of Fig. 11 while the spindle is rotating through 360°, the spindle and work will be shifted axially toward the left in that figure ⅓", and with threading hob 172 operatively engaged with the work, a complete, 3 pitch thread of approximately hob-length, will be milled in the work.

The nuts are sufficiently shorter than their mating leader screws to allow relative axial movement of at least pitch-extent, but since during the time-extent of relative axial movement, allowance must be made for movement of the hob transversely of the work into and out of operative engagement therewith, since slack between working parts sometimes has to be taken up, and since it is desirable to rotate the work through a little more than 360° while the hob is engaged therewith to make a smooth juncture between thread cuts, it is preferable that the nuts be sufficiently shorter than their associated leader screws to allow relative axial movement between them to an extent equal to about double pitch or lead. This proportionate length is shown in the illustrative embodiment.

For the purpose of restoring the nuts to their starting positions (an operation which will be later described in full) we have provided in the embodiment now being described, a torsion spring 219, whose opposite ends 220 and 221 (Fig. 12) are anchored to gear 54 (and, hence, in effect, to the spindle) and to nut 216, respectively. This spring rotates bodily with the spindle, but it is so wound and tensed that it has a tendency, when unopposed, to rotate nut 216 right-handedly and hence to maintain it in the position of Fig. 11, or if the nut is in the position of Fig. 17, to thread it toward the position of Fig. 11.

In order that this single spring 219 may act to restore all three nuts, there are provided connecting members in the form of pins 223 (Figs. 11, 14 and 17) which freely fit axially alined bores 224 in the three nuts, the outermost ends of the bores in the two outside nuts being plugged at 225 to prevent endwise dislodgement of the rods. Rods 223 are sufficiently short that they do not interfere with the movement of the two outside nuts when the latter are moved toward one another to their limits, a condition which is approximated in Fig. 17, though in that figure the nuts 217 and 218 are still capable of approaching one another more closely without interference from the rods.

Figure 17:
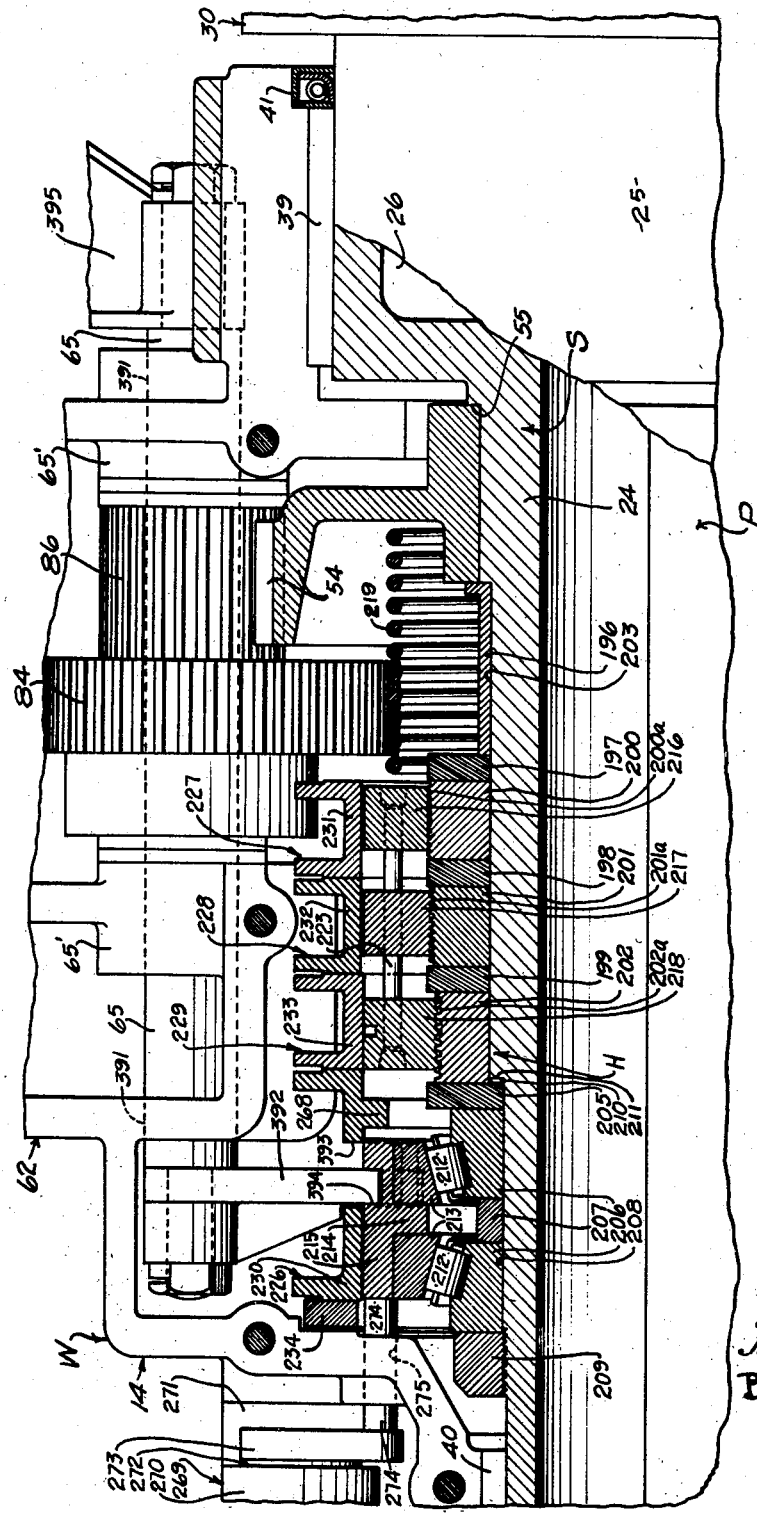
Fig. 17 is an enlarged fragmentary section on line 17—17 of Fig. 7.
Figure 18:
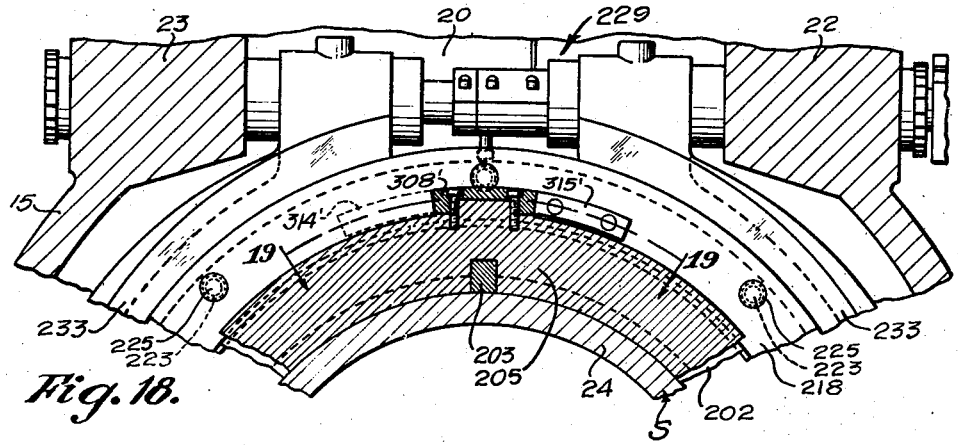
Fig. 18 is an enlarged fragmentary section on line 18—18 of Fig. 11.
Figure 19:
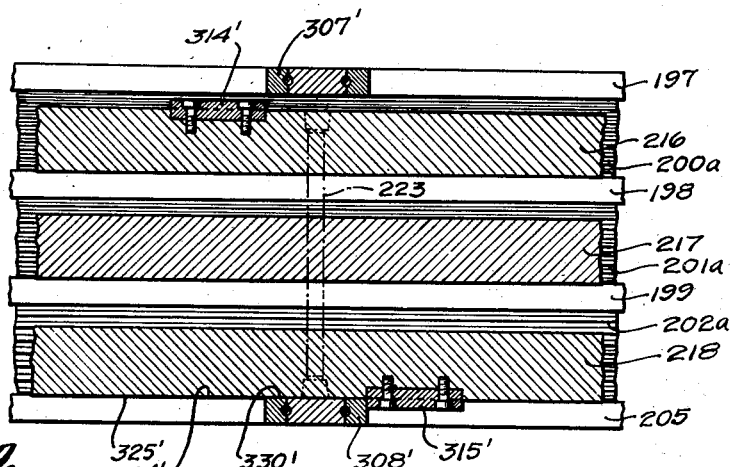
Fig. 19 is a developed section on line 19—19 of Fig. 18.

Due to the interconnection provided by rods 223, spring 219 tends to rotate all three nuts right-handedly, particularly when it is tensed as shown in Fig. 17. By the same token, when one of the nuts is clamped against rotation and axial movement, the other nuts are held against rotation by rods 223 but since, as will appear only one of the nuts may be so clamped at any one time, the other two nuts are free to move axially along with the spindle as it is threaded through the clamped nut. The unclamped nuts, due to their threaded connection with the rotating spindle, also move axially with respect to the spindle without effective interference from their respective, loosened clamps—in other words the two unclamped nuts move idly in an axial direction during the threading of the spindle through the clamped nut, so they do not in any way interfere with the normal operation of the clamped nut. Yet they are automatically restored to their starting positions by spring 219 upon unclamping of the initially clamped nut, as will appear. It will be understood that other means may be resorted to for restoring the nuts to their starting positions, and we will later describe such an embodiment wherein there is no interconnection between nuts nor a returning spring similar to 219.

We have also provided means whereby the nuts are automatically checked in their endwise movement with relation to the spindle in such a manner that there is no jamming effect on the threads or between the opposed end faces of the nuts and spindle-carried members, but this expedient is of such a nature that it may be described to better advantage in connection with another embodiment of the invention (wherein the nuts are not interconnected) and after that description we will go on to point out how the same fundamental is applied to the type under instant consideration.

At 226 is indicated a main or spindle clamping assembly adapted to coact with the floating spindle drum 215, while at 227, 228 and 229 are indicated individually operable clamping assemblies for nuts 216, 217 and 218, respectively. The nut clamps are identical in construction and therefore a detailed description of only one will suffice. However, before proceeding to that detailed description, it may be generally remarked that when a given nut clamp is loose, that particular nut is shiftable axially with respect to the spindle-supporting structure (which, for example, may be taken as the housing of the work head) either bodily with the spindle in its axial movement and/or by virtue of screw-thread movement between the spindle and nut either during the axial work-stroke of the spindle or during or at the end of the return stroke of the spindle.

When the spindle clamp 226 is loose (and assuming there is no other effective resisting force at the time) the spindle is free to shift bodily and axially through bearings 39 and 40, while, when the spindle clamp is tight, it holds the spindle against endwise shift but, due to bearings 212, does not hold the spindle against rotation.

It may be stated as a general rule that when any one of the nut clamps is tight the other two nut clamps are loose and the spindle clamp is loose, and that when the spindle clamp is tight, all the nut clamps are loose. As will be described, means is provided for assuring that such conditions always prevail. When we say a given nut clamp is "loose" we mean that it is sufficiently loose to permit the nut to slide axially through that clamp without effective interference. However, in certain instances, we may desire to adjust the nut clamps so they always have slight frictional dragging effect on the nuts to effect the automatic restoration of the nuts to starting positions after a milling operation (as we will describe) though in other instances we may wish to adjust the nut clamps so they may be sufficiently free or "loose" during turning operations that the nuts may more or less "float" within their clamping rings as bearings. Such adjustments are optional with the operator.

The clamping assemblies 226, 227, 228 and 229 individually include split brake or clamping bands 230, 231, 232, and 233, respectively, each of these bands being of channel cross section and being capable of diametrical constriction about and release from the particular element encircled thereby. The free ends of the band are supported and positioned by clamp-actuating shafts, later to be designated, which are supported, in turn, by housing casting 15. In order to hold the body portions of the clamp snugly together and against axial shifts with respect to the housing, though still allowing their constrictive and release movement, an end ring or gib 234 (Fig. 11) is applied against the outer flange of band 230 by adjustment bolts 235, while the outermost flange of band 231 engages shoulder 236 on the work head housing.

The individual actuating or rock shafts for clamps 226, 227, 228 and 229 are indicated at 237, 238, 239 and 240, respectively. As typical of the nut clamping assemblies, a description will be given of assembly 229 (Fig. 14).

Sleeves 241 and 242 are mounted for selective rotation in bosses 22 and 23, each sleeve having a reduced diameter portion 243 to take the terminal lugs 244 of band 233, said lugs being clamped between sleeve shoulders 245 and nuts 246 threaded on the inner ends of the sleeve. Set screws 247 insure against unintentional rotation of the sleeves within the lugs or within bosses 22, 23. The outer ends of the sleeves are provided with wrench-taking heads 248.

Shaft 240 extends through the two sleeves, having right hand threads 249 threadably engaging sleeve 240, and left hand threads 250 threadably engaging sleeve 242. With the sleeves held against rotation by nuts 246 and set screws 247, it will be seen that rotation of shaft 240 in a clockwise direction (as viewed in Fig. 1) causes sleeves 241 and 242 to spread apart axially, thus spreading band-terminals 244 and loosening band 233 from about nut 218, it being understood that in Fig. 14 and Fig. 1, clamp 229 is tight, while all the other nut clamps and the spindle clamp 226 are loose.

However, all nut clamps are fashioned similarly to clamp 229, that is, so clockwise rotation (Fig. 1) of their actuating shafts loosens the bands, while counter-clockwise rotation constricts and applies them.

To adjust the clamps, cover plate 21 is detached and nuts 246 and screws 247 are loosened. Then, with shaft 240 held stationary, one or both the sleeves are rotated by wrench-application to heads 248, threading the sleeves along the shaft to spread the band lugs or draw them closer together. Retightening of the nut and set-screws will then retain the parts in their new positions of adjustment.

Journalled on shaft 240 between threads 249 and 250, is a sleeve 251, held against endwise shift by collar 252 and the inner end of sleeve 241. Sleeve 251 carries a radial follower pin 253 which rides in the annular groove 254 in nut 218 (Figs. 14 and 17) while indicator hand 255 projects radially from the opposite side of the sleeve.

The hand or pointer is adapted to oscillate through indicator box 256 (on plate 21) as the nut moves axially to and fro either by virtue of bodily movement along the spindle S or by virtue of its screw thread movement along the spindle. Indicator hand may be viewed through glass panel 257 (Fig. 1) and a gage mark 258, on the visible, rear wall of box 256, is so located that when the hand is at the mark, it is assured that nut 218 is at a proper starting position (Fig. 11). Assuming nut 218 is clamped and the spindle is threaded to the left (as viewed in Fig. 11) through that nut, there will, of course, be no movement of the indicator hand. If the clamp then be released, the spindle is returned (by means to be described) to the position of Fig. 11, nut 218 sliding to the right along with the spindle and thus rocking hand 255 away from mark 258. Then, as the nut is threaded back to its starting position (as will be described) hand 255 will return into registration with mark 258. The operator is thus fully advised of the relative position of the nut 218 and, since all the nuts are interconnected by pins 223 and therefore when one is in starting position the others also will be, the spindle indicator serves to locate the positions of all the nuts. With this indication before him, the operator may be sure not to start a thread hobbing operation unless the nuts are in proper starting position.

It will be seen that the clamp assembly 226 for the main spindle is similar to that previously described, so far as the actuating mechanism is concerned, except that the threaded extent 249' on shaft 237 is left handed and threaded extent 250' is right handed. Accordingly, when shaft 237 is rotated in a clockwise direction (as viewed in Fig. 1) spindle band 230 is constricted about drum 215 (whereas rotation in that direction of the nut clamp shaft, loosened its respective band). As will be described, means is provided whereby the selected nut-clamp shaft and the spindle-clamp shaft may be simultaneously rotated in the same given direction, it following that when a selected nut clamp is tightened, the spindle clamp is loosened, and vice versa, though there may be positions of the control mechanism where all clamps are loose.

The main control lever for the nut clamps is indicated at 259, the upper end thereof having a releasable clamping fork 260 whereby the lever, with its clamping fork released, may be oscillated idly about shaft 238 (if nut 216 is to be idle for the current operation) or may, with its clamping fork tight about the shaft, be swung to rock shaft 238 in a manner to actuate clamp 227 (if nut 216 is to be active). Short levers 261 and 262 are likewise provided with releasable clamping forks, whereby they may be caused either to oscillate freely about their individual shafts 239 and 240, respectively, or be caused to rock said shafts for selectively actuating clamps 228 and 229, respectively. By utilizing a tie link 263 between levers 259, 261 and 262, the single lever 259 serves as a means for oscillating any chosen one of the nut clamps, it being understood that only one lever will be clamped to its clamp-actuating shaft at any one time, so there may be no danger of anchoring more than one nut. This interconnection of levers is also of advantage in that it is preferable that a certain valve control (to be described) is to be actuated when any one of the clamp actuating shafts is operated, and, by interconnecting the levers, a valve actuating pin 288 may be provided on the single lever 259 for cooperation with this valve and will serve to throw the valve irrespective of the particular lever which is actually in clamp-actuating condition. In other words, the path of only one lever (259) has to be considered in positioning the valve so it may be actuated, in spite of the fact that it may be any one of the clamp actuating levers which is in active condition.

In order to insure that clutch control lever 80 may not be shifted to a position engaging the high speed clutch 68 (Fig. 12) while any one of the leader nuts is clamped, an offset stop 264 is provided on lever 259 (Figs. 1 and 8). The stop lies in the swinging path of pin 265 (projecting rearwardly from clutch lever 80) when lever 259 is in the position of Figs. 1 and 8) which, as has been said, means that one of the leader nuts is clamped. Lever 80 may be swung to a vertical or neutral position wherein neither clutch 68 nor 69 is engaged, without interference between pin 265 and stop 264, but the lever cannot be swung sufficiently to the left, in Fig. 1, to engage the high speed clutch until lever 259 has been swung to the left of its position in Fig. 1 a distance sufficient to loosen the nut clamps.

Figure 16A:
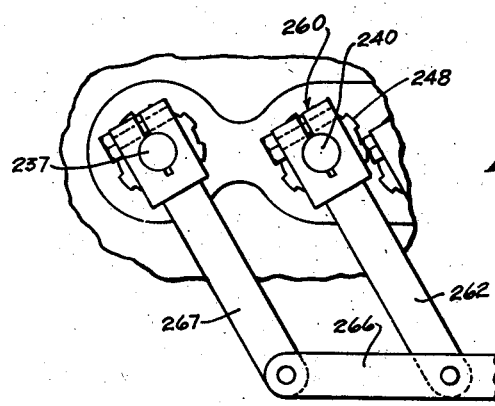
Fig. 16a is a fragmentary showing of a variational clamp-control.

The actuating shaft 237 of the spindle clamp 226 may be actuated in timed relation with respect to the actuation of any one of the nut clamps, either directly by actuation of lever 259 or through control of a fluid pressure mechanism, which control involves the swinging movement of said lever. However, for a beginning understanding of the operation of the device, it will be simpler to assume that the spindle clamp is actuated directly through movement of lever 259. A connection for effecting such movement is illustrated in dot-dash lines in Fig. 1 and in full lines in Fig. 16a. Thus, tie link 263 may be extended at 266 into connection with lever 267 which is clamped to actuating shaft 237, the link connection being such that levers 259, 261, 262 and 267 remain parallel throughout their angular movement.

With lever 267 thus tied to lever 259 by link 263—266, it will be seen that shaft 237 is rotated in unison with the particular nut-clamp shaft which is in active condition, and that, due to the described threading on the clamp actuating shafts, swinging movement of lever 259 to the left in Fig. 1 will loosen the active nut clamp and tighten the spindle clamp, while reverse swinging movement of lever 259 will reverse the clamp condition.

Clamp band 230, held against endwise shift with respect to the housing in the manner previously described, has an internal annular flange 268 (Figs. 11, 12 and 17), this flange forming a positive stop for drum 215, limiting the movement of the drum and hence the movement of spindle S and all parts rigid therewith, to the right, as viewed in those figures. In Figs. 11 and 12 the drum is against the stop flange and all parts are in the positions occupied at the start of a thread-milling operation and also in the positions they normally occupy during turning operations. In Fig. 17, the spindle and members rigid therewith or, at least, rigid so far as relative endwise movement is concerned, have been shifted to the left and away from stop 268, this movement having been generated by rotating spindle S while one of the master nuts has been clamped against rotation and axial shift. It will be assumed throughout this description that nut 218 is the one which is thus held clamped.

At the end of the milling cycle the parts will stand in the condition of Fig. 17 and it therefore becomes necessary to shift the spindle and the parts carried thereby back to the starting positions of Fig. 11, with drum 215 in engagement with flange 268, and also to thread the nuts back to their starting positions on the spindle.

For accomplishing the endwise or axial return of the spindle, we employ a very simple fluid pressure mechanism which is quick-acting and sure in operation. This mechanism includes a pair of rams, each generally indicated at 269, supported at opposite sides of the work head (Figs. 1, 12 and 17). Each ram comprises a cylinder 270 stationarily supported on bracket 271 which is secured to housing casting 14 (Fig. 1) and a piston 272 which has an external head 273 carrying an axially offset pin or plunger 274. The plungers of the two rams extend through bores 275 in casting 14 and into end engagement with the edge of drum 215, as clearly shown in Fig. 17.

A fluid pressure line 276 leads from ports 277 of both cylinders to a control valve 278 (Figs. 1 and 2). Connected to the opposite side of the valve is branch 279 of supply line 280 leading from a source (not shown) of fluid (air, for instance) under pressure. The rotary valve plug 281 has an actuating handle in the form of fork 282, and is ported at 283 and 284 so, when handle 282 is in the full line position of Fig. 1 and the dot-dash position of Fig. 2, supply line 279 is dead-ended at 285, while line 276 is in communication with exhaust ports 286 which may, if desired (but not necessarily) be provided with a spring-loaded relief valve 287.

When the spindle is threaded through a given clamped nut and thus shifted axially to the left from the position of Figs. 11 and 12 toward the position of Fig. 17, drum 215 thrusts pin 274 and hence piston 270 to the left as viewed in those figures, exhausting the cylinder-contained air through line 276 and ports 286, though if the exhaust port is provided with the spring-loaded valve, there will be a sufficient compression of air to serve as a yielding hold-back for the spindle to take up lost-motion or undue slackness, without setting up harmful resistance to spindle movement. Or, if desired, relief valve 287 may be eliminated and valve 278 adjusted or ported to admit relatively reduced pressure to the ram cylinders even when handle 282 is in the position of Fig. 1, so this reduced pressure may serve as a yieldable hold-back for the spindle during the hobbing operation to take up all slackness in the lead mechanism.

At the completion of a thread-milling operation, lever 259 is swung to the left in Fig. 1 to loosen the active nut clamp, a pin 288 on that lever engaging the fork 282 (Fig. 2, dot-dash line) to swing the fork to the dotted line position of Fig. 2, and this shifts plug 281 to a position where the exhaust port is dead-ended at 285 and supply line 279 is put into communication with line 276 to build up the pressure in cylinders 270 and thus rapidly thrust the piston 272, pin 274 and hence spindle S back to the starting position of Figs. 11 and 12.

This ram action occurs before lever 259 has been swung sufficiently to clamp the spindle, but the active nut clamp has been sufficiently loosened to permit its nut to slide axially through the clamp band as the spindle shifts axially to its starting position. When lever 259 is swung to the left through its full range, the spindle, now in its starting position, is tightly clamped against endwise shift to the left, though still free to rotate, and valve 278, being still in open condition permits the high fluid pressure to continue in operation against the ram pistons and thus aid in holding the spindle against such shift while turning operations are being performed on the work.

Of course when lever 259 is returned toward the position of Fig. 1, its pin 288 reenters fork 282 and swings it to the full line position of Fig. 1, thus exhausting the ram cylinders, so subsequent screw-thread movement of the spindle through a clamped nut may not be unduly retarded.

We will now give a brief statement of the operation of the machine as so far detailed. With work P chucked in the position of Figs. 1 and 11, with the spindle and its associated parts in the position of Figs. 11 and 12, with the controls in the positions of Figs. 1 and 9, and with the tool head T in position where the motor driven hob 173 lies within box J and opposed to the peripheral wall thereof at or a little ahead of the point where the box thread is to start, the machine may be considered as in condition for the start of a thread-hobbing operation, though it will be understood that this operation may not be and usually is not the beginning operation of the complete cycle involved in forming the joint end on the pipe.

Approximately at the same time that nut 218 is clamped by band 233, as has been described, the cross feed of the tool head is actuated to plunge hob 173 into the work, the cross feed being carefully controlled so that the cutter penetrates only to tooth-depth. The spindle and work are thus caused to be threaded through nut 218 at the linear rate of ⅓ of an inch per 360° of rotation. During this time, since clamps 226, 227 and 228 are loose, drum 215 and nuts 216 and 217 will shift axially along with the spindle and will shift axially with respect to their individual clamping bands. As has been said, due to the provision of pins 223, nuts 216 and 217 will have their bodily shifting movement, along with the spindle, differentially modified by their axial movement, due to their threaded engagement with the master screws, for said nuts are held by pins 223 against rotation while the spindle is rotating, and the only way this relative rotation can be accommodated is by relative axial movement between the spindle and the two inactive nuts.

Now it will be noted that since nut 218 is clamped against rotation with respect to the spindle housing or supporting means, and since pins 223 likewise hold nuts 216 and 217 against such rotation—though nuts 216 and 217 are capable of moving axially—the end of spring 219 which is anchored to nut 216 will be held against rotation, while the other end of spring, anchored to gear 54, will move angularly with that gear. Thus, during the rotation of the spindle, the spring is "wound up" so that its effective force, upon subsequent freeing of the clamped nut, is sufficient to thread the nuts right-handedly along the spindle.

From what has been said above, it will be apparent that the described angular and axial movement of spindle S will cause thread 10 to be milled in box J, which thread will have the pitch of nut threads 202a and the profile of the cutter teeth 178—179 on hob 173. The sequence of operations as now to be related, are not at all controlling and, in fact, in some cases are purposely given out of normal order so the description may be condensed as far as possible. As the work completes one revolution from the point at which the full-depth thread cut started or preferably after it has passed a little beyond the 360° point to insure smooth joining of the thread cuts, the tool head is backed away from the work and control lever 80 is thrown to an intermediate or vertical position which disengages clutch 69 and thus brings the spindle to rest. The tool head may then be shifted to the position of Fig. 1, whereupon turret T' is rotated to bring the next tool (for instance, boring bar 177) into effective position.

Control lever 259 is swung toward the left in Fig. 1, loosening clamp 229 on nut 218, whereupon spring 219 becomes effective, by its unwinding action, to thread all the nuts back to their starting positions on the spindle. Of course, the loosening of clamp 229 may not be sufficient to allow this return of the nut until after the spindle has been restored to its original position by actuation of valve 278, but this particular time relationship has no critical significance and for the purposes of description it will be assumed that the nuts have been threaded back before lever 259 has been swung sufficiently to engage fork 282. Now, however, lever 259 is swung further to the left in Fig. 1 to swing fork 282 to the dotted line position of Fig. 2 which, as has been described, admits fluid pressure to the rams and restores the spindle to the position of Figs. 11 and 12 where drum 215 engages flange 268, it being noted that the spindle clamp is not yet sufficiently tight to resist such endwise movement of the spindle. Continued movement of lever 259 in the same direction swings the spindle-clamp actuating arm 267 to a position where it causes a tight clamping of drum 215, thus preventing the spindle from moving to the left out of the position of Fig. 11, even though considerable end pressure be directed against the work by subsequent application of turning tools against the work. As has been said, the rams also assist in resisting such endwise movement of the spindle. However, due to the provision of bearings 212, it will be seen that the spindle is still capable of rotation.

Now in Fig. 17 the spindle and nuts are shown in the position to which they have been moved at the end of the thread milling operation, and it is from these positions that they are moved back to the positions of Figs. 11 and 12. However, it is particularly to be noted that it is not absolutely essential that all the nuts be moved clear back to the starting position of Figs. 11 and 12 in order to insure a full thread-cut on the subsequent thread hobbing operation. For that thread hobbing operation may be started no matter where the nuts lie on their leader screws, provided there is sufficient linear extent of thread ahead of the nut to insure there may be subsequent advance of at least one full pitch plus a little allowance for over-run.

The motor may now be reversed and clutch lever 80 swung to a position which will drivingly engage clutch 68, with the result that the work is rotated at a much higher speed and in a direction opposite that in which it rotated during the milling operation. The tool head may then be advanced to perform turning or boring operations, as by feeding boring bar 177 into the work both axially and, if the operation calls for it, transversely of the work axis. During this operation the nuts merely rotate idly with the spindle and within their clamping bands, producing no spindle-lead and in no way interfering with normal turning operations.

In lieu of the use of lever 267 for actuating the spindle clamp from lever 259, a fluid pressure and automatically controlled mechanism may be utilized. In this event, lever 267 is removed and there is substituted therefor a lever or crank arm 291 on the spindle-clamp actuating shaft 237 at the rear side of the machine (Figs. 1, 9 and 15). Lever 291 is connected to rod 292 of piston 293, the latter being adapted to be reciprocated through cylinder 294 which is pivotally connected at its lower end 295 with an upright strap 296 secured to the ram cylinder 270 which is located at the rear of the machine (see Fig. 12). A pipe line 296' leads from the top of cylinder 294 to valve 297 which is attached to casting 14. Pipe line 298 leads from the bottom of the cylinder to said valve (Figs. 1, 3 and 4). A branch 299 of fluid-pressure supply line 280 leads to the other side of valve 297 and is adapted selectively to be put into communication with either pipe 296' or 298 by rotation of valve plug 300, said plug having a forked control handle 301 which lies in the path of pin 265 (Figs. 1 and 8) on clutch-control lever 80.

When handle 301 is in the full line position of Fig. 1 and the dot-dash line position of Fig. 3, the top of the cylinder is in communication with supply line 299 through the plug port 302, while the bottom of the cylinder is in communication through pipe 298 and plug port 303 with exhaust port 304, it following that the piston is held at the bottom of the cylinder, and crank arm 291 is held in a position where the spindle clamp 296 is released.

After the thread milling operation is completed and when lever 259 is swung sufficiently to the left in Fig. 1 to clear the path of pin 265, clutch lever 80 is swung to the left sufficiently to engage pin 265 with fork 301 and to swing that fork to the dotted line position of Fig. 3. This movement rotates plug 300 to a position where the top of cylinder 294 is exhausted through pipe 296 and ports 303, 304; while fluid pressure from line 299 is admitted to the bottom of cylinder 294 through port 302 and pipe 298. This application of fluid pressure to the bottom of piston 293 swings crank 291 in a clockwise direction, as viewed in Fig. 1, and applies the main spindle clamp 226 to drum 215 to hold the spindle against endwise shift, it being appreciated that actuation of valve 278 will previously have applied ram-pressure to the spindle to restore it to its starting position.

Upon subsequent return movement of clutch lever 80 towards its milling-speed clutch-engaging position, pin 265 will again engage fork 301 and return it to the full line position in Fig. 1 and the dot-dash line position in Fig. 3, whereupon the piston will be depressed through the cylinder and will rock arm 291 in a direction to loosen the spindle clamp.

It is possible to restore the nuts to their starting positions (that is, to move them from the positions of Fig. 17 to those of Fig. 11) by a manipulation which permits the entire elimination of spring 219. To explain this, we will first assume the nuts are in the positions illustrated in Fig. 17. They have reached the indicated position, with respect to the spindle, by right-hand rotation of the spindle threads while the nuts have been held against rotation—nut 218 by clamp 233 and nuts 216 and 217 by their interconnection with nut 218 through pins 223, though nuts 216 and 217 have moved axially with respect to their bands while nut 218 has been held by its band against axial movement. If now the spindle be rotated left-handedly and the nuts be held against rotation, it will be seen that they will be moved threadably with respect to the spindle back towards spacer rings 205, 199 and 198, respectively. However, since the spindle will in the meantime have been returned to a position where drum 215 engages flange 268 and is held in that position, the nuts must be threaded back along the spindle, rather than threading the spindle back through the nuts. Accordingly, and also due to the fact that the nuts have different leads, though they are interconnected by pins 223, said nuts must have a capacity for sliding axially through their clamping bands during this restoration movement.

Therefore to restore the nuts by reverse rotation of the spindle, lever 259 is actuated to apply only enough frictional drag on nut 218 (and thus, in effect on all the nuts, due to their rod-interconnection) by the clamp band 233, to insure that there is some relative rotation between the nuts and the spindle and yet permit the axial movement of the nuts with respect to their clamp bands. In fact, in some instances, the bands may be normally adjusted so they inherently impose sufficient frictional drag, even though relatively "loose," to initiate this restoring movement immediately upon reversing the direction of spindle rotation. In the latter event, the nuts will "creep" back to their starting position, though since the turning speed is much higher than the milling speed a very slight frictional drag on the nuts will set up sufficient relative angular movement between the nuts and spindle to restore the nuts to starting position in a relatively short time. In fact, since ordinarily a turning operation will follow any given hobbing operation, the restoration of the nuts will be assured long before the next hobbing operation is to occur.

In order that the nuts may not be jammed against adjacent surfaces and so the threads, themselves may not jam when the nuts are returned to starting positions, we have provided a novel stop means which will be described later in connection with another variation, but it is to be noted that it is within the capacity of the machine to restore the nuts to their starting positions by a single, high-speed reverse rotation of the spindle. This ordinarily would cause severe impact when the nuts reach their starting positions and therefore is not recommended, but it is to be noted that even in that event danger of damage is greatly minimized since the interconnection between the stationary spindle housing and the nuts is solely through frictional engagement between clamps and nuts and therefore there is always the opportunity for slippage before there is likelihood of damage.

Where the return of the nuts is by way of frictional drag and reverse spindle rotation (as distinguished from the torsional-spring return) it is preferable that pins 223 be omitted and that individual stops for each of the nuts be provided—it later being made apparent that when such stops are applied to the pin-connected nuts, there is required only one set of stops for the entire nut assembly. We have shown such a variational embodiment, including the separate stops, in Figs. 20 through 24. Most of the parts shown in this variation are similar to the previously described corresponding elements and therefore will be given the same numerals and there will be no need of repetitive description. Such elements as have been changed in form have been indicated by similar, but primed, numerals.

Fig. 20 shows the positions of the spindle and nuts when in starting position, while Fig. 21 shows the positions they occupy at the end of a thread hobbing operation. Since nuts 216', 217' and 218' are no longer rod-interconnected, they are capable of relative rotation, and when a given nut (218', for instance) is clamped against rotation and axial movement with respect to the housing, nuts 216' and 217' may remain against their stop rings 198' and 199', respectively, as the spindle is threaded through nut 218' (see Fig. 21). Nuts 216' and 217' thus have relative axial movement with respect to the spindle housing but do not necessarily move with relation to the spindle as the latter is shifted axially. Also, nuts 216' and 217' require individual position indicators and are provided with annular grooves 254' to take the followers 253' adapted to actuate the individual indicator hands or pointers 255' and 255", the indicator box 256' being enlarged to accommodate the additional hands and carrying the additional starting marks 258' and 258".

The clamping of the chosen nut (here nut 218') the threaded advance of the spindle through that nut, the unclamping of the nut and the return of the spindle, are all accomplished as described in connection with the other embodiment of the invention, the only difference in action being that nuts 216' and 217' remain in their starting positions with respect to the spindle (though sliding axially through the clamp bands) so that only nut 218' has to be restored to its original position with respect to the spindle. This restoration is accomplished by applying frictional drag on nut 218' as the spindle is being reversely rotated, as described in connection with the embodiment where the nuts were interconnected but no torsion spring used. And, as there described, this drag may be imposed by the mere normal frictional drag of the nut clamp band if the clamping assembly be adjusted to impose such a drag even when the clamp is "loose" or by swinging control lever 259 to a position where the clamp imposes just sufficient drag to set up the threaded return of the nut without having a tendency overly to retard the movement of the nut axially through the clamp.

We will now describe the means whereby the axial movement of the nut in either direction with respect to the spindle is positively stopped at the desired limits of nut travel without jamming those nuts either on the thread or against the adjacent side structure, which in this case happens to be the spacer rings on the spindle, though more broadly the invention contemplates the provision of such stop members on any part of the machine adjacent the nuts or spindles with respect to which either of them may rotate relatively.

Bolted to the peripheral edges of spacer rings 197', 198', 199' and 205' are stop lugs 305, 306, 307 and 308, respectively. Preferably, the lugs have key-interfit 309 with their respective rings, the better to resist shearing stresses imposed when end pressure is applied against the lugs during the checking of nut-rotation.

Bolted to opposite sides of nut 216', but relatively angularly displaced, are stop lugs 310 and 311 which, in their cooperation with lugs 305 and 306, respectively, serve as limit stops for the nut. Lugs 311 and 310, respectively, may be considered as the stops for the starting and finishing positions of the nut. Lugs 312 and 313 are mounted in a similar manner on nut 217' for cooperation with ring-lugs 306 and 307, respectively, while lugs 314 and 315 are mounted in a similar manner on nut 218' for cooperation with ring-lugs 307 and 308, respectively; it being noted that ring-lug 306 is adapted selectively to cooperate with the lugs on the opposed faces of nuts 216' and 217', while lug 307 also does double duty by its adaptation for selective cooperation with the lugs on nuts 217', 218'.

Since the action of any one nut and its stops is typical of the action of all, we will describe only the action of nut 218', and will refer particularly to Figs. 25 through 27 for this purpose. These figures are schematic views wherein certain dimensions are relatively exaggerated in order to bring out certain relational characteristics which would not otherwise be clearly discernible. In this connection, reference will be made to certain critical clearances which exist between the side faces of the nut and rings when the nuts are at either limit of their axial travel. These clearances are indicated in the schematic views, but they are relatively so small it has not been practicable to indicate them in such views as Figs. 20, 21 and 24.

In order that ready reference may be had to certain faces and shoulders during the following discussion, we will first designate such faces and shoulders without relating their characteristics in detail. The side face of ring 199' is indicated at 316, said face being opposed by side face 317 of nut 218', it being face 317 from which lug 314 projects. The angularly spaced end faces of ring-lug 307 are indicated at 318 and 319, while the end faces of nut lug 314 are indicated at 320 and 321. The opposed side faces of lugs 307 and 314 are designated at 322 and 323, respectively.

The side face of ring 205' is indicated at 324, said face being opposed by side face 325 of nut 218', it being face 325 from which lug 315 projects. The end faces of ring lug 308 are designated at 326 and 327, while the end faces of nut lug 315 are indicated at 328 and 329. The opposed side faces of lugs 308 and 315 are designated at 330 and 331, respectively. The end faces or shoulders 318, 319, 320, 321, 326, 327, 328 and 329 are all substantially parallel to the axis of the spindle and thus are but little out of normal with respect to the line of nut travel in a circumferential direction, it following that when a nut-lug shoulder is engaged by a ring-lug shoulder to prevent further relative rotation between nut and spindle, there is practically no tendency to jam the threads by wedge action if the application of torque be continued.

Fig. 25 shows the relative positions of the parts when nut 218' is in its starting condition (Fig. 20) and it will later be assumed that the nut is clamped while the spindle is rotated right-handedly to thread it through the nut, which means rings 199' and 205' (keyed to the spindle, as has been described) will move rotatively in the direction of the arrows and will move axially in the direction toward the bottom of the sheet.

The path of lug corner 332 (at the junction of faces 326 and 330 of lug 308) is indicated by the dot-dash line 333, the portion of the line with the single dots being the path at the near side of the spindle and the line with the triple dots being the path at the far side. Similarly, the path of lug corner 334 (at the junction of faces 318 and 322 of lug 307) is indicated at 335.

We will first assume that the spindle and nuts are relatively stationary with the parts in the position of Fig. 25. It will be seen that clearance exists between the side face 325 of nut 218', on the one hand, and side faces 324 and 330 of ring 205' and lug 308 on the other hand, and that lug shoulders 329 and 327 are in engagement. Accordingly, no matter how great may be the force tending to thread nut 218' toward ring 205', there never can be any frictional contact between the side face of the nut and ring 205', in other words these faces can never be jammed together. If the forces tending to thread the nut in that direction are continued after shoulder 329 engages shoulder 327, the nut will simply slip within its clamping band. It is further to be noted that the extent of overlap between the contacting ends of the lugs is almost equal to the pitch of the thread of the associated nut, and this is sufficient to give amply extensive shoulders.

Now assume that the nut be clamped and that the spindle be rotated to thread it downwardly through nut 218', meaning that lug 308 will back away from nut 218' through a helical path. Lug 315 is of such length, measured axially of the spindle, that when the spindle has been rotated through an angle which brings the corner 332 of ring-lug 308 opposite the corner 332' of lug 315 (which occurs just a little short of one complete revolution of the spindle) the corners 332 and 332' will clear by a distance equal to the initial clearance between face 325 and face 324, lug 308 thus being capable of passing lug 315 without interference, so the ring 205' and hence the spindle may continue in its rotation and threaded movement through the nut (Fig. 26).

Lug 314 is of such length (measured axially of the spindle) that during continued rotation of the spindle (and hence ring 199') and at a time just after lug 308 has passed lug 315, the corner 334 of lug 307 will clear corner 334' of lug 314, so these two lugs may pass without interference. However, when the spindle is given approximately one more revolution, end shoulder 319 of lug 307 will contact shoulder 320 of lug 314, preventing further threaded movement of the spindle through the nut but, as indicated in Fig. 27, preventing the side face 317 of nut 218' from frictionally engaging the side faces 316 and 322 of ring 199' and lug 307, respectively; the clearance between these faces being approximately equal to the clearance originally existing between side faces 324 and 325 and being measured by the linear extent of clearance between corners 334 and 334' as they pass.

Fig. 27 thus indicates the limiting end stop for the threaded movement of the spindle through the nut at the finishing end of a hobbing operation, and, if the rotation of the spindle be continued after lugs 307 and 314 are engaged, the nut will be rotated by the spindle and will slip within its clamping band. It will be noted that the limit stop takes effect after the spindle (and thus rings 199' and 205') have been given almost two complete revolutions, thus giving a capacity for endwise movement to the spindle of an extent substantially equal to double the lead of the master thread, the significance of which has been pointed out above.

When the spindle is reversely rotated and a frictional drag is placed on nut 218', said nut will be threaded back from the position of Fig. 27 to that of Fig. 25, the several lugs clearing throughout the first full relative revolution as was described in connection with the opposite movement, but lugs 315 and 308 reengaging, as in Fig. 25, at a point just short of the completion of the second revolution. It has been noted before that when the parts are in the condition of Fig. 25, clearance exists between face 325 and faces 324—330, it following that the nut has been threaded back to its starting position but there is no possibility of jamming or wedging the side faces of the nuts and the spacer ring 205'.

As has been said, in the embodiment shown in Figs. 20 through 23, there are separate starting and finishing position stops for each individual nut. On the other hand, in the embodiment shown in Figs. 11, 12, 17, 18 and 19, where the several nuts are interconnected by pins 223 and hence always move or are held against rotation as one, there is the necessity of but a single set of stop assemblies.

In this case, lugs 308', 315', 314' and 307' are mounted on ring 205, nut 218, nut 216, and spacer ring 197, respectively. The lugs are proportioned and relatively arranged in the same manner as are the corresponding lugs just described, and their action is precisely the same. That is, with the lug 315' in contact with lug 308', the side face 325' will be spaced slightly apart from side faces 324' and 330' of ring 205 and lug 308', respectively. Similarly, the opposed side faces of nut 217 and ring 199 will be spaced apart, as will also be the side faces of nuts 216 and ring 198, for these three nuts, being tied together, will always occupy the same relative starting position, and the indicated clearances will be initially arranged for by proper proportioning of parts, though, as was said in connection with the other embodiment, the clearances are so relatively small that there has been no attempt made to indicate them either on Fig. 19 or Fig. 11.

As was described in connection with the other variation, one complete revolution between the nut and spindle may be accomplished without interference between any of the lugs, but just prior to the completion of the second revolution, lug 314' will engage lug 307' and will check further relative rotation while axially measured clearances still exist between the upper faces of the nut (as viewed in Fig. 19) and the lower faces of the adjacent spacer ring.

For accomplishing relatively rapid fore and aft movement of tool head T, particularly if the movement is to be of any considerable linear extent, we provide a rapid traverse mechanism which includes a cylinder 337 bolted to the front face of bed member 79 (Figs. 1 and 6) and a piston 338, the piston rod 339 extending into connection with hanger 340 which depends from carriage D. By the introduction of fluid pressure to opposite sides of the piston, it will be seen that the carriage may be rapidly traversed, assuming all interfering carriage feeds and locks are released. Since it involves no part of the present invention, the fluid pressure system for reciprocating the piston and the control means for that system will not be described in detail. It will suffice to state that a circulating pump 341, driven by motor 342, is connected by piping 343 through valve 344 (Fig. 9) and piping 345 to the opposite end of cylinder 337. Valve 344 is controlled by crank 346 and link 347, crank 346 being on rockshaft 348 which extends to the forward face of the machine, at which point it carries a control lever 349 (Fig. 1).

In connection with the other power and hand feeds for giving fore and aft movement, reference will be had to Fig. 32. Worm 135 meshes with worm wheel 350 on shaft 351, this worm wheel making up one-half of the clutch generally indicated at 352, which clutch is controlled in the usual manner by rocking control lever 353. Clutch member 354 has a pinion 355 meshed with gear 356 on shaft 147. It will be apparent that when clutch 352 is engaged, shaft 132 rotates pinion 148 through the following drive; worm 135, worm wheel 350, clutch member 354, pinion 355, gear 356, and shaft 147. Rotation of pinion 148, due to its engagement with rack 149, causes carriage D to travel longitudinally of bed B, and this travel will, due to the interconnections specified, be in timed relation with the angular velocity and, if the spindle is being threaded endwise, with the axial movement of the spindle.

On the other hand, if clutch 352 be disengaged, the carriage may be moved along the bed by rotation of hand wheel 358 (Fig. 1) the shaft 359 thereof carrying a pinion 360 which meshes with gear 356.

It is also essential that the turret T', carried on carriage D, be shifted transversely with respect to the longitudinal axis of the work, this movement being essential not only for applying certain of the tools to the work, as in making the plunge-cut with the threading hob, as previously described, but also, in the event taper threads are being milled, the turret is to be moved in a direction normal to the work axis in timed relation to the endwise movement of the work and spindle. We will now proceed to describe the means for effecting the cross feed of the turret, first pointing out the means for effecting such movement independently of the endwise travel of the spindle.

Figure 35:
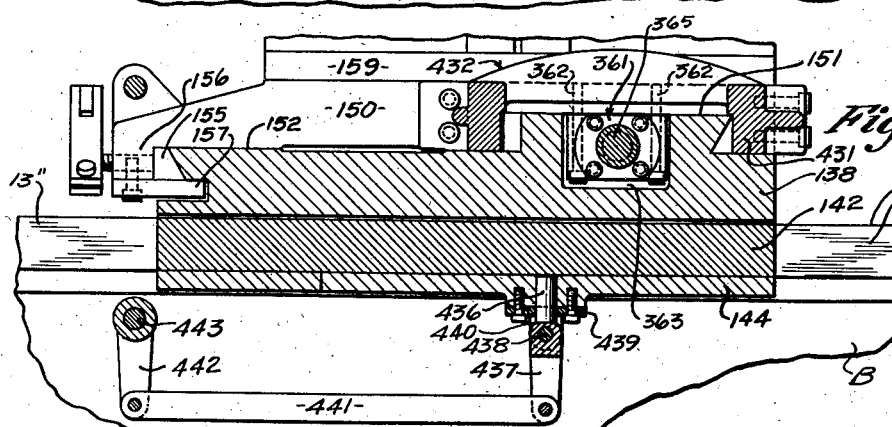
Fig. 35 is an enlarged section on line 35—35 of Fig. 31.

For this purpose, reference will first be made to Figs. 31 and 35. A two-part nut 361 is bolted in the through way 363 in slide 150, 138. The thread-section 364 of longitudinally telescopic feed screw 365 is threaded through the nut; the longitudinally telescopic joint 366 rotatively drivingly connecting sections 364 and shaft section 367 of the feed screw. The unthreaded extent 368 of section 364 is journalled in member 370 of the taper attachment (to be described) being held against axial movement with respect to that member by collars 371. For the time being we may consider member 370 as being stationary with respect to main slide 138, it following that said member holds the threaded section 364 against axial movement, though permitting its rotation.

The outer end 372 of section 367 is keyed to gear 373 which is located within housing 374. With the parts in the condition shown, it will be obvious that any means serving to rotate gear 374 will thread nut 361 along section 364 and thus move turret T' in a direction normal to the axis of the spindle. We have shown here selectively operable hand feed means 375 and power feed means 376 for imparting feed rotation to screw 365.

Means 375 includes the hand wheel 377 rotatably mounted on the axially shiftable shaft 378, this shaft having sliding-key connection with sleeve 379 which carries a gear 380, the latter being constantly in mesh with gear 373. When the handle and shaft are pushed inwardly to the extent shown in Fig. 31, the hand wheel is clutched (clutch not shown) to sleeve 379, it following that rotation of the hand wheel rotates pinion 380 and thus rotates screw 335 through gear 373.

Rotatably mounted on sleeve 379 is gear 382 having a clutch face 383 opposing the cone-clutch member 384 which is fixed to and both bodily and rotatably movable with the shaft 378. When the shaft is thrust to the position of Fig. 31 to connect the hand feed, clutch member 384 is out of engagement with gear clutch 383 and gear 382 may thus be held against rotation by its power drive mechanism while the sleeve is being manually rotated.

Gear 382 meshes with pinion 385 which is mounted for rotation on stud shaft 386 and is engaged by pinion 387 of driving motor 388, here shown as being of the air-driven type, though this is of course not limitative.

When the handle wheel and shaft 378 are shifted to the left from the position of Fig. 31, the clutch between the hand wheel and sleeve 379 is disengaged, while clutch member 384 is drawn into frictional engagement with gear clutch 383, it following that when the motor 388 is operated, the drive to gear 373 is through the following path; pinion 387, pinion 385, gear 382, clutch member 384, shaft 378, and pinion 380. It will be obvious that the provision of motor 388 allows for easy and rapid cross feeding of the turret when occasion arises for relatively extensive movement, and, of course, the speed of the motor may be varied to suit varying demands.

We will now describe the taper attachment, particular reference being made to Figs. 10, 15, 17, 31 and 33 through 35. Referring first to Figs. 17 and 15, it will be seen that shaft 65 is mounted for endwise sliding movement at 391 through the walls of housing-casting 14, the inner end of the shaft carrying an arm 392 (Fig. 15) which projects through an opening 393 in the band 230 of the spindle clamp and into a groove 394 of drum 215. It will be remembered that drum 215 shifts axially with the spindle throughout movement of that spindle under the impetus of a clamp nut or rams 269. Accordingly, shaft 65 will likewise move axially as one with the sp'ndle, and hence, during the thread hobbing operation, will move axially in timed relation with the angular movement of the spindle.

Externally of the housing, shaft 65 carries an arm 395 (Figs. 5, 8 and 17) to which is welded a bar 396 which is, in effect, an offset extension of shaft 65, being parallel and movable longitudinally as one therewith.

Bar 396 has sliding fit in bosses 397 depending from bracket 145 (Figs. 31, 33 and 34) which bracket is, as has been said, bolted to main sl:de 138 and movable bodily therewith.

Bracket 145 has way 398 which is parallel to the bed ways 13 and 13', to which is fitted for longitudinal sliding movement a slide member 399. Member 399 has an extension 400 carrying at its free end a split clamp 401 (Figs. 10 and 34) encircling bar 396. Clamp screw 402, with right hand threads, is adapted to be rotated to draw together or spread the clamp end and thus connect the slide member to or release it from bar 396.

On the end of clamp screw 402 is a double-ended crank 403, the crank end 404 of which is connected to rod 405 of piston 406, the latter being adapted to be reciprocated through cylinder 407 which is pivoted at 408 to bracket 409, the latter being rigidly carried by slide member 399. The other end 410 of crank 403 is connected by link 411 to crank arm 412 (Fig. 33) this latter crank arm being carried by the left-hand threaded clamp screw 413 (Fig. 31) which extends through the flange 414 of member 399 and against gib 415 which is interposed between that flange and the side of way 398.

Figure 33:
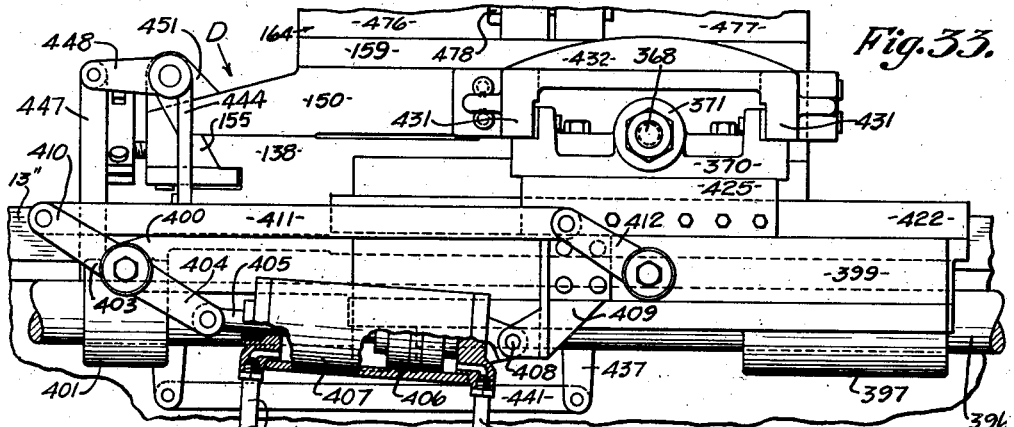
Fig. 33 is a fragmentary enlarged elevation of the taper attachment as viewed from the position of arrow 33 in Fig. 5.
Figure 34:
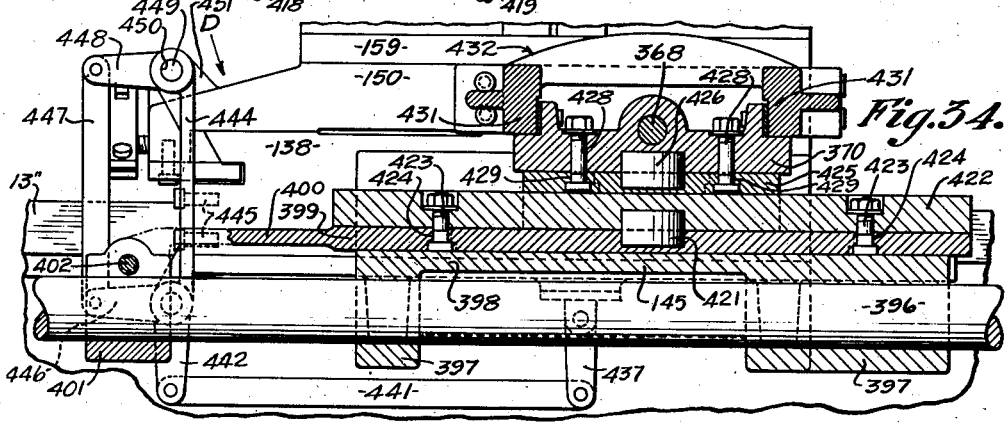
Fig. 34 is an enlarged fragmentary section on line 34—34 of Fig. 31 or 34a—34a of Fig. 5.

When the parts are in the positions of Figs. 31 and 33, clamp screw 413 is tight and holds slide member 399 against longitudinal movement with respect to bracket 145, while clamp 401 is loose and relative sliding movement may therefore occur between the tool head and bar 396 so axial movement of the spindle is in no way interfered with by the tool-head mechanism and so the tool head may be shifted over the bed ways without interference from bar 396. On the other hand, slide member 399 is now, in effect, clamped rigidly to main slide 138 and will move rigidly therewith during fore and aft movement of the tool head, it thus being assured that relative movement cannot occur between the parts of the taper attachment which, if slide member 399 were not clamped, might have relative movement which would affect the cross feed.

Figure 10:
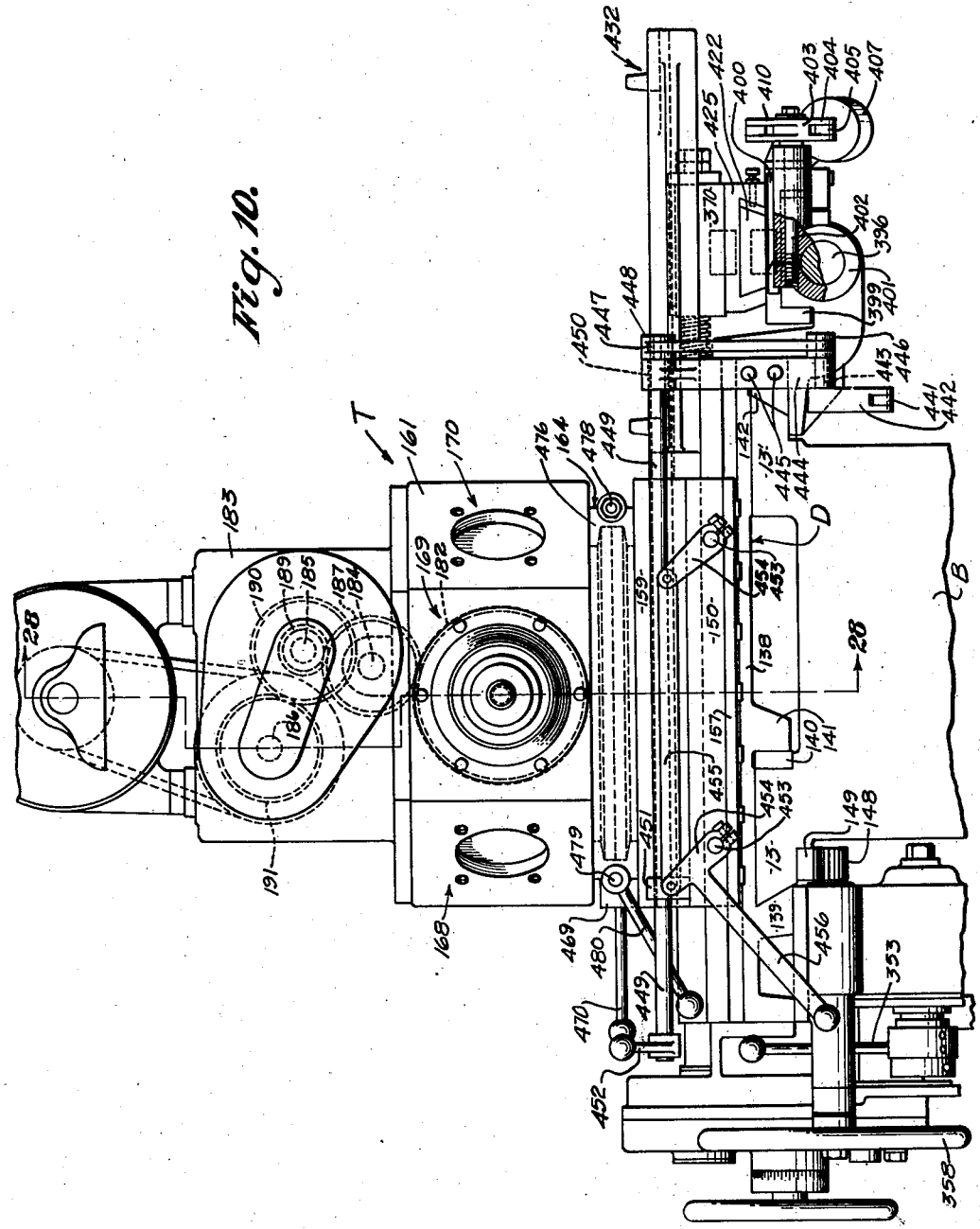
Fig. 10 is an enlarged fragmentary end elevation of the tool head, as viewed from the right of Fig. 1.
Figure 33A:
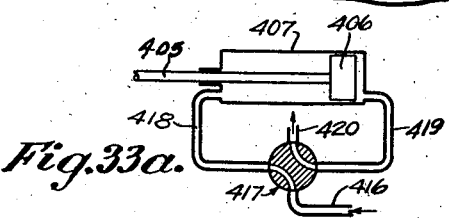
Fig. 33a is a diagrammatic showing of a valve for controlling the taper-attachment clamp.

Fig. 33a is a diagrammatic view showing the valve control for effecting axial movement of piston 406 under the influence of applied fluid pressure. A fluid pressure supply pipe 416 leads to valve 417, one side of which is connected by pipe 418 to cylinder 407 at the left side of piston 406 (Fig. 33) while the cylinder at the right side of piston 406 is connected by pipe 419 to the valve 417, said valve now being in a position where pipe 419 will be in communication with exhaust 420. When the plug of valve 417 is rotated through 90°, as it will be when it is desired to put the taper attachment into effect, supply line 416 communicates with pipe 419 while pipe 418 is opened to exhaust 420, it following that piston 406 will be forced to the left in Fig. 33, thus swinging cranks 403 and 412 in a clockwise direction, which has the effect of loosening clamp 413 (Fig. 31) and tightening clamp 401 (Fig. 10). This action frees member 399 for sliding movement with respect to the bracket 145 and connects members 399 and bar 396 for coincidental axial movement when spindle S moves endwise.

Centrally pivoted at 421 on member 399 is dovetail way 422 (Figs. 31 and 34) which carries clamp bolts 423 extending into slots 424 in member 399, said slots being arcuate as viewed in plan (Fig. 5) and being struck about pivot 421 as a center. Slide member 425 has dove-tail interfit with way 422 (Fig. 31) and has a central stud 426 which establishes its pivotal movement with respect to cross-slide block 370 which, as has been described, takes end 368 of the cross feed screw 365. Block 370 carries clamp bolts 428 which extend into slots 429 in member 425, said slots being arcuate as viewed in plan (Fig. 5) and being struck about pivot 426 as a center.

Block 370 is guided for movement toward and away from cross slide 150 by ways 431 which are parallel to the axis of the cross feed screw and are provided by a bracket 432 which is bolted to cross slide 150.

When the taper attachment is not in effect, way 422 may be clamped at 423 so it lies axially parallel with member 399. However, when the taper attachment is to be put into effect, clamp bolts 423 and 428 are loosened and way 422 is rotated about pivot 421 and the coincidental axis of stud 426 to a position of angular adjustment which will generate the proper thread taper when bar 396 is subsequently moved endwise. With way 422 in adjusted position, clamp bolts 423 and 428 are retightened. Clamp 401 will have been previously tightened, it following that as bar 396 is moved endwise through axial movement of the spindle, the now angularly disposed way 422 will slide through member 425 and cause movement of block 370 longitudinally through ways 431. This causes coincident axial movement of the threaded section 364 of screw 365 (the telescopic joint 366 accommodating such endwise movement with relation to screw section 367) and carries nut 361 bodily with it. Since this nut is attached to cross slide 150, the axial movement of the screw will shift the cross slide in a direction normal to the axis of spindle rotation, and this movement will be in timed relation to the axial movement of spindle S and, accordingly, with the angular movement of that spindle. Thus, with the milling hob properly engaged with the work, it will mill the threads so, when finished, it has the predetermined degree of taper.

The same taper attachment is effective for turning tapers with a tool stationarily held in the turret and with the work spindle held against axial movement. In this case, rod 396 is held by the spindle against axial movement and it holds (through clamp 401) member 399 against endwise movement. Then, with way 422 set at a predetermined angle, the cross slide is shifted across slide 138 as the tool head is fed longitudinally of bed B, the feed of the head being accomplished through the power-drive mechanism shown in Fig. 32 and hence in timed relation to the angular movement of the work spindle.

For establishing the limit of cross-feed in one direction or the other, adjustable stop screw 433 may be attached to main slide 138 at 434 or 435 (Figs. 1 and 32) for limiting the extent of or for establishing the starting point of any cross feed operation, it being understood that the machine is capable of interchangeably milling either towards the near side or far side of the work, as viewed in Fig. 1.

During the performance of certain operations, it is either necessary or highly desirable that the tool head be tightly clamped against movement fore and aft of bed B. The clamp for accomplishing this end is shown in Figs. 1, 31, 34 and 35. It involves vertically reciprocal plunger 436 mounted in bracket flange 144 (Figs. 1, 31 and 35) at a point beneath triangular gib 142. Crank 437 is pivoted at 438 on a bracket 439 applied to the underside of flange 144, the upper end of the crank having cam faces 440 so, when crank 437 is rotated from the position of Fig. 34, plunger 436 thrusts upwardly on gib 142 and wedges it tightly between face 13'' of way 13' and the inner face of flange 143, thus frictionally clamping main slide 138 against the sliding movement along the bed ways.

The crank 437 is rocked to and from clamping position through the following mechanism. Link 441 connects crank 437 to crank 442 on rock-shaft 443, the latter being journalled in hanger 444 which is bolted at 445 to main slide 138. Shaft 443 also carries a crank 446 (Figs. 10 and 34) connected by link 447 to crank arm 448 on rock-shaft 449. The shaft is journalled at 450 in the upper end of hanger 444 and also journalled in but capable of relative sliding movement through bracket 451 on cross-feed slide 150. Shaft 449 carries a control lever 452 whereby it may be rocked to cause the ultimate actuation of clamp plunger 436.

It is also desirable and sometimes necessary to clamp cross slide 150 from movement transversely with respect to main slide 138. For this purpose, a pair of clamp screws 453 (Figs. 10, 28 and 34) are threaded through flange 156 of cross slide 150 into engagement with triangular gib 154. Cranks 454 on the clamp screws are connected by link 455, the forward crank having an integral control handle 456 whereby the clamping screws may be rotated simultaneously.

By rotating lever 456 in one direction, screws 453 are actuated in a manner to pressurally engage gib 154 with main slide 138 and thus frictionally clamp the main slide 138 and cross slide 150 against relatively sliding movement, while rotation in the opposite direction backs the clamping screws out and thus unclamps the cross slide from the main slide.

Now referring particularly to Fig. 28, we have previously noted that stud 163 centers spindle housing 161 for rotation on turn-table base 159. In order that this housing may be locked in any position of angular adjustment where any given turret tool occupies a position in direct opposition to the work carried by the work spindle, we have provided the releasable "station-lock" shown in Figs. 28 and 30. Vertically reciprocal plunger or pin 165, with a tapered, upper end 165a, is constantly urged upwardly by spring 457 located within the plunger bore 458 and within the tubular slide member 459 which also extends into the plunger bore from beneath and is bottomed on the upper face of main slide 138. The lower face of spindle housing 161 has a plurality of sockets 460, bushed to a taper, there being one socket for each tool-station on the turret and the sockets being so spaced that they will individually register with plunger 165 when their corresponding tool stations are in effective opposition to the work. With a given socket in register with the plunger 165, that plunger will be spring-urged into the position of Fig. 30 to lock the turret in selected position against rotation with respect to cross slide 150.

For withdrawing pin 165 in order to permit rotation of the turret to a newly selected position, we provide a bell crank 461 pivoted at 462 to member 150, and having an arm 463 engaged in the side notch 464 of plunger 165 (Figs. 28 and 30). The other arm 465 of bell crank 461 is loosely pivotally connected to rack bar 466 which is adapted to be reciprocated by oscillation of gear segment 467, this segment being carried by rock shaft 468 journalled in the side walls of housing 469 and carrying an actuating crank or lever 470. It will be obvious that movement of lever 470 in a counter clockwise direction, as viewed in Fig. 30, will swing bell crank 461 in the same direction and thus withdraw plunger 165 from socket 460. Upon release of plunger 460, spring 458 will urge the plunger upwardly, and as soon as another socket is in register therewith, the plunger will automatically move up into that socket and restore the actuating mechanism to the position of Fig. 30. To positively insure proper turret alinement if the spring has not fully entered the socket, lever 470 may be actuated to force the pin upwardly to full seat.

It is also desirable that means be provided for clamping the turret tightly down to the turn-table base 159 after the turret has been turned to a position presenting the selected station, or tool at that station, in effective opposition to the work. The previously mentioned clamp ring 164 is utilized for this purpose. As noted by reference to Fig. 30, ring 164 has two internal annular flanges 471 and 472 which extend into base groove 160 and housing groove 162, respectively. The opposed and oppositely inclined faces of flanges 471 and 472 define an annular groove 473 of conical cross section which takes the tapering, annular flanges 474 and 475 provided, respectively, on base 159 (which is bolted to cross slide 150) and on spindle housing 161.

Ring 164 is made up of two arcuate sections 476 and 477 (Figs. 1, 10, 28 and 33). The ends of the sections at the rear side of the machine are connected at 478 (Figs. 10 and 33) while right-and-left threaded clamp screw 479 connects the section ends at the forward side of the machine, said clamp screw 479 being selectively actuatable through lever 480 to constrict or radially loosen the sectional ring 164. When the ring is constricted, the inclined faces defining groove 473 exert a wedging action on flanges 474 and 475, tightly clamping them together and thus not only aiding pin 165 in holding the turret against rotation, but also taking up any vertical slackness and thus insuring that the turret is rigidly supported in a perfectly vertical position. On the other hand, when clamp ring 164 is loose, it presents no effective resistance to turret-rotation.

We have previously established the drive connection between motor M and tool spindle 176. Since the motor is mounted rigidly on the rotatable turret and must move fore and aft of bed B along with the turret, and since the motor must also revolve with the turret as the latter is angularly shifted to present different tools to the work, it will be seen that it is desirable that special provision be made for supplying current to the motor which will take into account all such movement. A simplified arrangement of this character is shown in Figs. 28 and 29.

Bracket 481 is secured to the top of the motor and carries disk 482 from which rises a central pivot post 483. The hub 484 of circular plate 485 is journalled on post 483 and is held against vertical shift by disk 482 and retainer cap 486.

A bar 487 extends rigidly from plate projection 488 toward the work head of the machine. On casting 15 is a vertical standard 489 (Fig. 1) carrying a sleeve 490 which is free to oscillate on the standard about a vertical axis 491. Bar 487 is free to slide through sleeve 490 as the turret is moved fore and aft, while the swivelling connection between the sleeve and standard will accommodate transverse shifting of the turret and the movement, when the turret is rotated, due to the eccentric arrangement of table-pivot 163 and plate-pivot 483. However, bar 487 holds plate 485 against other than very limited rotation when the turret is rotated beneath it to bring different tools into working position.

Power supply lines 492 lead to insulated box 493 carried rigidly by plate 485, and are there connected to individual collector rings 494 which are insulated one from the other and from plate 485, and they are, of course, spaced vertically from disk 482. Disk 482, which turns with the motor in its bodily rotation about axis 163, carries brushes 495 engaging the several collector rings and connected to motor leads 496. A control and reversing switch is indicated at 497. Thus, it will be seen that irrespective of the position of the turret with respect to the bed of the machine and irrespective of the position to which the turret is angularly adjusted about its vertical axis, the power source, as controlled by switch 497, is constantly in connection with the motor.

Rod 487 serves as a very convenient means for supporting trolley wheels 498 from which depends a carriage 499. Lubrication hoses 500 or other tools or implements may be carried by carriage 499 and thus shifted easily as occasion for their use or storage demands.

Now considering Fig. 28, let it be assumed that spindle 176 is being driven in a clockwise direction as viewed from the left of that figure and that this direction of rotation is necessary for performing the particular operation which is to be accomplished by the tool to be positioned on spindle end 175. If we now consider that the turret be rotated through 180° to position spindle end 174 in opposition to the work and if the motor still continues to drive the spindle in the same direction throughout the turning movement of the turret, it will be seen that spindle end 174 will be rotating in a counter-clockwise direction as viewed from the left of Fig. 28. And ordinarily this will be the wrong direction of rotation for the tool to be applied to that spindle end 174. Consequently, under such conditions, switch 497 would have to be operated to reverse the motor and thus reverse the direction of spindle drive. To avoid the necessity of thus manually actuating switch 497, we have devised the automatic switching arrangement as shown in Figs. 36 to 40, wherein the motor is reversed automatically when a given spindle is turned end-for-end, and also automatically puts the motor into and out of circuit as the turret is moved to position where a live spindle is moved into and out of effective opposition with respect to the work.

The disk, plate, collector ring, and brush assembly will be just as described in connection with Figs. 28 and 29, and the power supply line 492 may have interposed therein a switch 497 for manual control of the motor. However, there are additionally supplied the two switch boxes 500 and 501 carried on top of plate 485 and hence held relatively stationary by bar 487. These switch boxes are identical. Each switch box includes a housing 502 of insulating material through which a central switch plunger 503 is adapted to be reciprocated. Within housing 502 are supported the longitudinally spaced contacts 504 which are insulated one from the other and are connected to the individual power supply lines. In the housing, at points diametrically opposite contacts 504, are contacts 505 which are also insulated one from the other and from the housing. These contacts are connected to motor leads 496 via collector rings 494 and brushes 495.

Slidably mounted on insulating bushing 506, which encircles plunger 503 and held against endwise movement therealong, are contact plates 507 which are urged toward their associated contacts 504 and 505 by springs 507' which have end-bearing against bushing flanges 508. Main spring 509 tends normally to project the plunger 503 radially outward, but Fig. 39 shows that this plunger has been thrust radially inward against spring 509 by virtue of a cam plate 510 which is bolted at 511 to the underside of disk 482 and hence is adapted to move bodily with the motor in its rotation about axis 163. Plunger 503 carries a roller 512 for engagement with cam 510 as the turret approaches and reaches a position where one end of the live spindle is opposed to the work. With the plunger thrust by cam 510 to the position of Fig. 39, it will be seen that contact plates 507 connect contacts 504 with corresponding contacts 505, and it will be assumed that under these conditions, the circuiting is such that motor M will be rotated in a direction proper to give the desired direction of tool-rotation.

When the turret is rotated in either direction to an extent where roller 512 leaves cam 510, spring 509 will radially project plunger 503 and the bushing flanges will separate contact members 507 from contacts 504 and 505, thus interrupting the circuit to motor M and bringing it to rest for, of course, there is no need for tool-spindle rotation so long as one of the statinary turret tools is performing its operation on the work. However, if the turret be rotated through 180°, switch 501, which up to this time has been open because its plunger 503' has been spring-projected to the open condition just described in connection with switch 501, will engage cam 510 and thus close switch 501 so that it is in the condition of Fig. 39. However, by reference to the wiring diagram in Fig. 40, it will be seen that when switch 501 is closed, the circuiting is such that the direction of rotation of motor M will be reversed and therefore spindle end 174, which has now been moved to the position of end 175 in Fig. 28, will be rotated in the same direction, as viewed from the left in Fig. 28, as was spindle end 175 when it last occupied its operative position.

In Figs. 41 to 44, inclusive, we have shown variational types of screw and nut mountings, it being characteristic of all three variations that only a single nut-clamp is used, though provision is made for very rapid substitution of one set of copy screws and nuts for another, and in fact, in one of the variations and in spite of the fact that only a single nut-clamp is used, there is a plurality of screws and nuts of different pitches which may be selectively brought under the control of this single clamp.

In these views we have not attempted to show the nut stops nor any details of the clamps, clamp-actuating mechanisms, etc., and it will be unnecessary to describe such features since they may follow generally the descriptions given in connection with the other embodiments.

In Fig. 41 the nut assembly is located near the end of spindle S adjacent chuck 32, casting 15 being formed to provide a housing 515. With bolts 33 unscrewed and chuck 32 removed from the end of the spindle, the master screw 516, corresponding to any one of the master screws in the earlier described embodiments and chosen for the particular pitch of its thread, may be slipped endwise onto spindle S and into keyed relation with that spindle. Nut 517, mating with screw 516, will normally be on the screw when the latter is attached to the spindle, and thus comes into operative association with nut clamp 518. End plate 519 is then applied to housing 515, said end ring and housing wall 520 holding nut-clamp 518 in proper position in much the same manner as gib 234 and shoulder 236 in Fig. 11.

Chuck 32 is then re-bolted to the spindle and, with spindle shoulder 24', positions the nut axially on the spindle, it being recognized that the spindle, chuck and screw 516 rotate as one. It will be obvious that by actuating the spindle S and clamp 518 in the manner described in connection with the earlier embodiments, the spindle may be threaded through the nut, the spindle returned to its starting position, and the nut restored to its starting position on the spindle by a frictional drag imposed through clamp 518 on the nut while the spindle is rotating reversely. Or, of course, a spring-return for the nut may be provided.

When occasion arises for milling threads of different pitches, it is an easy matter to replace the screw and nut assembly by removing the chuck, sliding the nut and screw endwise off the spindle and substituting a screw and nut of different pitch, in the manner described for the initial insertion of the nut and screw shown.

In Fig. 42 the nut and clamp assembly is located in the same general position with relation to the spindle, but here the assembly is mounted at such radial distance from the spindle axis, that said assembly may be applied or replaced by movement endwise with respect to the spindle without requiring detachment of the chuck.

Thus, the inside diameter of screw 521 is greater than the outside diameter of chuck 32, and in order to support this relatively large-diameter screw from the spindle, there is employed a ring 522 keyed to the spindle and held against movement endwise of the shaft between chuck-shoulder 523 and spindle-shoulder 524. Screw 521 may be slipped endwise over the flange 525 of ring 522, being keyed thereto and held against endwise movement by annular lip 527 and removable key-screw 528.

In this variation we have also shown an additional feature whereby, though but a single nut clamp 518 is utilized, there are stored within the machine a plurality of nuts having different pitches, any one of which may be selectively put into effective operation by very slight adjustment. Thus, the bore of nut 530 is provided with threads of a pitch which match threads on screw 521, while the outer periphery of nut 530 is provided with threads of a different pitch. Threaded on the outside of nut 530 is a second nut 531 whose bore is threaded to match the threads on the outside of nut 530, while the outer peripheral face of nut 531 is smooth and is adapted to take the band of clamp 518. Across the junction line of screw 521 and nut 530 is provided a threaded bore 532, while a similar bore 533 is provided across the junction line of nuts 530 and 531.

By inserting threaded plug 534 within bore 532, as illustrated in Fig. 42, screw 521 and nut 530 are locked against both relative axial movement and rotation and thus act as one, nut 530 being rigid with relation to the ring 522 and the spindle so its outer thread becomes the lead screw on the spindle and nut 531 acts as the lead nut.

On the other hand, if plug 534 be inserted in bore 533, leaving bore 532 unoccupied, nuts 530 and 531 are tied together so they become, in effect, but a single nut, with the thread in the bore of nut 530 acting to give the effective lead. Yet, irrespective of which nut may be the effective one, the single band 518 is effective to perform all the functions previously ascribed to the similar bands. Of course, the nuts may be increased in number over that shown, so the number of pitches available for selection may be greater than two, there then being provided means whereby each adjacent pair of nuts may be interlocked or released.

The diametrically-split end-plate 535 may be readily removed for giving access to the housing when it becomes desirable to make a nut-selection or if a given set of nested nuts is to be replaced by another set having different individual pitches.

Figs. 43 and 44 show another variation of nut and screw mounting, where a single nut and screw set is utilized, but this set is easily replaceable by a set having different pitch, in spite of that fact that the nut and clamp assembly is located within the main portion of the work head housing.

The master screw 541 is made up of a plurality of arcuate sections, here being shown as two in number, each section being bolted to spindle S as at 542. Between the relatively wide spacer ring 543 and nut clamping band 544, is a ring 545, within the bore of which is secured the sectional nut 546, the sections here being shown as two in number and each being bolted to ring 545 at 547.

When nut 546 is to be held so the spindle may be threaded therethrough to produce spindle-lead, clamp 544 is constricted about ring 545 which is, in all effect, a part of nut 546.

When occasion arises for inserting a master screw and nut having different pitch characteristics, housing plate 21 is removed and bolts 547 are withdrawn from both the nut and ring 545. The ring may then be thrust to the left, as viewed in Fig. 43, until its righthand edge clears the lefthand edge of nut 546, whereupon the nut sections may be removed from the spindle. The removal of the nut sections exposes the ends of bolts 542 which are then removed to free the sectional screw 541 from the housing.

A new set made up of nut and screw having different pitch characteristics, may be assembled with the spindle by proceeding in reverse order.

While we have shown and described preferred embodiments of our invention it is to be understood various changes in design, structure and arrangement may be made without departing from the spirit and scope of the appended claims.

We claim:

1. In a device of the character described, a support, a spindle rotatably mounted on the support, threads on the spindle, means for rotating the spindle, said spindle being movable axially with respect to the support, a nut having screw-thread connection with the spindle threads, said nut being mounted for movement axially with respect to the support, releasable means actuatable to hold the nut against such axial movement whereby the spindle is moved threadably in one direction through the nut upon rotation of the spindle with relation to the nut, means for moving the spindle axially in the other direction, and means for threadably returning the nut toward its starting position on the spindle.

2. In a device of the character described, a support, a spindle rotatably mounted on the support, a plurality of threads on the spindle, means for rotating the spindle, said spindle being movable axially with respect to the support, a plurality of nuts having screw thread connection with the spindle threads, the screw threads of one nut and its matching spindle threads having pitch characteristics different from the pitch characteristics of another nut and its matching spindle threads, said nuts being mounted for movement axially with respect to the support, and selective means actuatable to selectively hold the individual nuts against such axial movement.

3. In a device of the character described, a support, a spindle rotatably mounted on the support, a plurality of threads on the spindle, means for rotating the spindle, said spindle being movable axially with respect to the support, a plurality of nuts having screw thread connection with the spindle threads, the screw threads of one nut and its matching spindle threads having pitch characteristics different from the pitch characteristics of another nut and its matching spindle threads, said nuts being mounted for rotation and movement axially with respect to the support, and selective means actuatable to selectively hold the individual nuts against such rotation and axial movement.

4. In a device of the character described, a support, a spindle rotatably mounted on the support, threads on the spindle, means for rotating the spindle, said spindle being movable axially with respect to the support, a nut having screw-thread connection with the spindle threads, said nut being mounted for rotation and movement axially with respect to the support, releasable means actuatable to hold the nut against such axial movement and against rotation whereby the spindle is moved threadably in one direction axially through the nut upon rotation of the spindle in one direction, means for moving the spindle axially in the other direction, and means for returning the nut towards its starting position on the spindle.

5. In a device of the character described, a support, a spindle rotatably mounted on the support, threads on the spindle, means for rotating the spindle, said spindle being movable axially with respect to the support, a nut having screw-thread connection with the spindle threads, said nut being mounted for rotation and movement axially with respect to the support, releasable means actuatable to hold the nut against such axial movement and against rotation whereby the spindle is moved threadably in one direction axially through the nut upon rotation of the spindle in one direction, means for moving the spindle axially in the other direction, and spring means for returning the nut towards its starting position on the spindle.

6. In a device of the character described, a support, a spindle rotatably mounted on the support, threads on the spindle, means for rotating the spindle, said spindle being movable axially with respect to the support, a nut having screw-thread connection with the spindle threads, said nut being mounted for rotation and movement axially with respect to the support, releasable means actuatable to hold the nut against such axial movement and against rotation whereby the spindle is moved threadably in one direction axially through the nut upon rotation of the spindle in one direction, means for moving the spindle axially in the other direction, and a torsion spring connecting the spindle and nut, which spring is adapted to be wound during spindle rotation while the nut is held against movement and is effective to rotate the nut relative to the spindle and thus threadably move it towards its starting position on the spindle when the nut is subsequently released for movement.

7. In a device of the character described, a support, a spindle rotatably mounted on the support, threads on the spindle, means for rotating the spindle in either direction, said spindle being movable axially with respect to the support, a nut having a screw-thread connection with the spindle threads, said nut being mounted for rotation and movement axially with respect to the support, releasable means actuatable to hold the nut against such axial movement and against rotation whereby the spindle is moved threadably in one direction axially through the nut upon rotation of the spindle in one direction, means for moving the spindle axially in the other direction, said nut holding means being selectively actuatable to return the nut towards its starting position on the spindle when the spindle is reversely rotated.

8. In a device of the character described, a support, a spindle rotatably mounted on the support, threads on the spindle, means for rotating the spindle, said spindle being movable axially with respect to the support, a nut having screw-thread connection with the spindle threads, said nut being mounted for rotation and movement axially with respect to the support, releasable means actuatable to hold the nut against such axial movement and against rotation whereby the spindle is moved threadably in one direction through the nut upon rotation of the spindle with relation to the nut, means for moving the spindle axially in the other direction, means for threadably returning the nut toward its starting position on the spindle, and means adapted to act on the nut for limiting its extent of axial movement at least in one direction.

9. In a device of the character described, a support, a spindle rotatably mounted on the support, threads on the spindle, means for rotating the spindle, said spindle being movable axially with respect to the support, a nut having screw-thread connection with the spindle threads, said nut being mounted for rotation and movement axially with respect to the support and towards relatively rotating structure, releasable means actuatable to hold the nut against such axial movement and against rotation whereby the spindle is moved threadably in one direction through the nut upon rotation of the spindle with relation to the nut, means for moving the spindle axially in the other direction, means for threadably returning the nut toward its starting position on the spindle, and means adapted to act on the nut for limiting its extent of axial movement at least in one direction and without engaging its leading side face with said relatively rotating structure.

10. In a device of the character described, a support, a spindle rotatably mounted on the support, threads on the spindle, means for rotating the spindle, said spindle being movable axially with respect to the support, a nut having screw-thread connection with the spindle threads, said nut being mounted for rotation and movement axially with respect to the support, releasable means actuable to hold the nut against such rotation and axial movement whereby the spindle is moved threadably in one direction through the nut upon rotation of the spindle with relation to the nut, means for moving the spindle axially in the other direction, means for threadably returning the nut toward its starting position on the spindle, and means adapted to prevent the spindle and nut from being relatively threaded into binding engagement with one another at the end of the spindle thread.

11. In a device of the character described, a support, a spindle rotatably mounted on the support, threads on the spindle, means for rotating the spindle, said spindle being movable axially with respect to the support, a nut having screw-thread connection with the spindle threads, said nut being mounted for rotation and movement axially with respect to the support, releasable means actuatable to hold the nut against such rotation and axial movement, a stop carrying member on the spindle, a stop on said member and a cooperating stop on the nut, said stops, when in cooperation, preventing relative screw thread movement between the nut and the spindle in a given direction, there being provided axially extending clearance between the nut and the stop carrying member when the stops are in such cooperation.

12. In a device of the character described, a support, a spindle rotatably mounted on the support, threads on the spindle, means for rotating the spindle, said spindle being movable axially with respect to the support, releasable means for holding the spindle against axial movement while leaving it free for rotation, a nut having screw-thread connection with the spindle threads, said nut being mounted for rotation and movement axially with respect to the support, releasable means actuatable to hold the nut against such axial movement and against rotation whereby, when the spindle holding means is released, the spindle is moved threadably in one direction through the nut upon rotation of the spindle with relation to the nut, means for moving the spindle axially in the other direction, and means for threadably returning the nut towards its starting position on the spindle.

13. In a device of the character described, a support, a spindle rotatably mounted on the support, threads on the spindle, means for rotating the spindle, said spindle being movable axially with respect to the support, releasable means for holding the spindle against axial movement while leaving it free for rotation, a nut having screw-thread connection with the spindle threads, said nut being mounted for rotation and movement axially with respect to the support, releasable means actuatable to hold the nut against such axial movement and against rotation whereby, when the spindle holding means is released, the spindle is moved threadably in one direction through the nut upon rotation of the spindle with relation to the nut, means for moving the spindle axially in the other direction, means for threadably returning the nut toward its starting position on the spindle, and individual control means for the two holding means.

14. In a device of the character described, a support, a spindle rotatably mounted on the support, threads on the spindle, means for rotating the spindle, said spindle being movable axially with respect to the support, releasable means for holding the spindle against axial movement while leaving it free for rotation, a nut having screw-thread connection with the spindle threads, said nut being mounted for rotation and movement axially with respect to the support, releasable means actuatable to hold the nut against such axial movement and against rotation, individual control means for the two holding means, and means associating said control means whereby, when one holding means is actuated to holding condition, the other holding means is actuated to release condition.

15. In a device of the character described, a support, a spindle rotatably mounted on the support, a plurality of threads on the spindle, means for rotating the spindle, said spindle being movable axially with respect to the support, a plurality of nuts having screw-thread connection with the spindle threads, the screw threads of one nut and its matching spindle threads having pitch characteristics different from the pitch characteristics of another nut and its matching spindle threads, said nuts being mounted for rotation and movement axially with respect to the support, and selective means actuatable to selectively hold the individual nuts against such axial movement and against rotation whereby the spindle is moved threadably in one direction axially through a held nut upon rotation of the spindle in one direction, means for moving the spindle axially in the other direction, and means for returning the held nut, upon release thereof, towards its starting position on the spindle.

16. In a device of the character described, a support, a spindle rotatably mounted on the support, a plurality of threads on the spindle, means for rotating the spindle, said spindle being movable axially with respect to the support, a plurality of nuts having screw-thread connection with the spindle threads, the screw threads of one nut and its matching spindle threads having pitch characteristics different from the pitch characteristics of another nut and its matching spindle threads, said nuts being mounted for rotation and movement axially with respect to the support, and selective means actuatable to selectively hold the individual nuts against such axial movement and against rotation whereby the spindle is moved threadably in one direction axially through a held nut upon rotation of the spindle in one direction, means for moving the spindle axially in the other direction, and means for returning all the nuts towards their starting positions on the spindle when the held nut is subsequently released.

17. In a device of the character described, a support, a spindle rotatably mounted on the support, a plurality of threads on the spindle, means for rotating the spindle, said spindle being movable axially with respect to the support, a plurality of nuts interconnected against relative rotation and having screw-thread connection with the spindle threads, the screw threads of one nut and its matching spindle threads having pitch characteristics different from the pitch characteristics of another nut and its matching spindle threads, said nuts being mounted for rotation and movement axially with respect to the support, and selective means actuatable to selectively hold the individual nuts against such axial movement and against rotation whereby the spindle is moved threadably in one direction axially through a held nut upon rotation of the spindle in one direction, means for moving the spindle axially in the other direction, and means for returning the held nut, upon release thereof, and thereby the interconnected nuts towards their starting positions on the spindle.

18. In a device of the character described, a support, a spindle rotatably mounted on the support, a plurality of threads on the spindle, means for rotating the spindle, said spindle being movable axially with respect to the support, a plurality of nuts having screw thread connection with the spindle threads, the screw threads of one nut and its matching spindle threads having pitch characteristics different from the pitch characteristics of another nut and its matching spindle threads, said nuts being mounted for axial movement and rotation with respect to the support, means rendering only one of said nuts effective to move the spindle axially by virtue of spindle rotation, and a single releasable means actuatable to act on the effective nut, irrespective of which nut it may be, to hold said nut against such axial movement and rotation.

19. In a device of the character described, a housing, a support within the housing, a spindle rotatably mounted on the support, threads on the spindle, means for rotating the spindle, said spindle being movable axially with respect to the support, a nut having screw-thread connection with the spindle threads, said nut being mounted for movement axially with respect to the support, releasable means actuatable to hold the nut against such axial movement whereby the spindle is moved threadably in one direction through the nut upon rotation of the spindle with relation to the nut, means for moving the spindle axially in the other direction, means for threadably returning the nut toward its starting position on the spindle, and means visible externally of the housing and indicating the position of the nut relative to the spindle.

20. In a device of the character described, a rotatable work spindle, a motor, a pair of pulleys, a pair of continuously acting drive connections, one between the motor and one of the pulleys and the other between the motor and the other pulley, one of said connections being adapted to drive the associated pulley at a given speed in a given direction, a gear train in the other connection adapted to drive the other pulley in the given direction but at a speed other than the given speed, a drive shaft, a pair of selectively operable clutches arranged, one each, between the pulleys and the drive shaft, and a change-speed gear connection between the drive shaft and spindle.

21. In a device of the character described, a rotatable work spindle, a motor, a pair of pulleys, a pair of continuously acting drive connections, one between the motor and one of the pulleys and the other between the motor and the other pulley, one of said connections being adapted to drive the associated pulley at a given speed in a given direction, a gear train in the other connection adapted to drive the other pulley in the given direction but at a speed other than the given speed, a drive shaft, a pair of selectively operable clutches arranged, one each, between the pulleys and the drive shaft, a change-speed gear connection between the drive shaft and spindle, and a single control lever operatively connected to both clutches and operable sequentially to disengage one clutch and engage the other clutch.

22. In a device of the character described, a housing, a spindle supported in the housing for rotation and axial movement therein, threads on the spindle, a drive shaft, an operative connection between the shaft and spindle for rotating the spindle, a clutch in said connection, a clutch-control, a nut threaded on the spindle threads, releasable means for clamping the nut against rotation whereby rotation of the spindle moves the spindle axially, means for controlling the releasable means, and cooperative means associated with the clutch control and the last mentioned control means, whereby the clutch control is, at times, controlled in its movement by the condition of the control of the releasable means.

23. In a device of the character described, a housing, a spindle supported in the housing for rotation and axial movement therein, threads on the spindle, a drive shaft, an operative connection between the shaft and spindle for rotating the spindle, a clutch in said connection, a clutch-control, a nut threaded on the spindle threads and rotatable and movable axially with respect to the housing, releasable means for clamping the nut against rotation and axial movement whereby rotation of the spindle thereby moves the spindle axially in one direction through the nut, means for controlling the releasable means, means for moving the spindle axially in the other direction, means for threadably returning the nut toward its starting position on the spindle, and cooperative means associated with the clutch control and the last mentioned control means, whereby the clutch control is, at times, controlled in its movement by the condition of the control of the releasable means.

24. In a device of the character described, a support, a spindle rotatably mounted on the support, threads on the spindle, a cylindrical nut having threaded connection with the spindle threads, external threads on the outer periphery of the nut and of different pitch characteristics than the internal threads of the nut, a second nut having threaded connection with the external threads on the first mentioned nut, said nuts being mounted for axial movement and rotation with respect to the support, selectively appliable means for either holding the two nuts against relative movement or holding the first mentioned nut against movement relative to the spindle, and releasable means adapted to cooperate with the second mentioned nut for holding it against axial movement and rotation with respect to the support.

25. In a device of the character described, a support, a spindle rotatably mounted on the support, threads on the spindle, a cylindrical nut having threaded connection with the spindle threads, external threads on the outer periphery of the nut and of different pitch characteristics than the internal threads of the nut, a second nut having threaded connection with the external threads on the first mentioned nut, said nuts being mounted for axial movement and rotation with respect to the support, releasable means holding the two nuts against relative movement, and releasable means adapted to cooperate with the second mentioned nut for holding it against axial movement and rotation with respect to the support.

26. In a device of the character described, a support, a spindle rotatably mounted on the support, threads on the spindle, a cylindrical nut having threaded connection with the spindle threads, external threads on the outer periphery of the nut and of different pitch characteristics than the internal threads of the nut, a second nut having threaded connection with the external threads on the first mentioned nut, said nuts being mounted for axial movement and rotation with respect to the support, releasable means holding the first mentioned nut against movement relative to the spindle, and releasable means adapted to cooperate with the second mentioned nut for holding it against axial movement and rotation with respect to the support.

27. In a device of the character described, a support, a spindle rotatably mounted on the support, threads on the spindle, means for rotating the spindle, said spindle being movable axially with respect to the support, a nut having screw-thread connection with the spindle threads, said nut being mounted for movement axially with respect to the support, releasable means actuatable to hold the nut against such axial movement, whereby the spindle is moved threadably in one direction through the nut upon rotation of the spindle with relation to the nut, fluid-pressure means for moving the spindle axially in the other direction, and means for threadably returning the nut toward its starting position on the spindle.

ALBERT L. STONE.
JOSEPH H. APPLETON.